United States Patent
Bairavasundaram et al.

(10) Patent No.: US 9,274,838 B2
(45) Date of Patent: Mar. 1, 2016

(54) DYNAMIC INSTANTIATION AND MANAGEMENT OF VIRTUAL CACHING APPLIANCES

(75) Inventors: Lakshmi Narayanan Bairavasundaram, Sunnyvale, CA (US); Gokul Soundararajan, Sunnyvale, CA (US); Vipul Mathur, Karnataka (IN); Kaladhar Voruganti, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1069 days.

(21) Appl. No.: 13/334,689

(22) Filed: Dec. 22, 2011

(65) Prior Publication Data

US 2013/0166724 A1 Jun. 27, 2013

(51) Int. Cl.
*H04L 12/751* (2013.01)
*H04L 12/803* (2013.01)
*G06F 9/50* (2006.01)
*G06F 12/08* (2006.01)
*G06F 11/07* (2006.01)
*H04L 12/24* (2006.01)
*G06F 11/34* (2006.01)

(52) U.S. Cl.
CPC ............ *G06F 9/5016* (2013.01); *G06F 9/5077* (2013.01); *G06F 11/073* (2013.01); *G06F 12/0806* (2013.01); *H04L 41/0816* (2013.01); *H04L 41/0896* (2013.01); *G06F 11/3409* (2013.01)

(58) Field of Classification Search
CPC ............ H04L 41/0816; H04L 41/0896; H04L 41/0823; H04L 67/2842; G06F 17/30132; G06F 12/08; G06F 12/0806; G06F 12/0893; G06F 11/073; G06F 9/5077; G06F 9/45533
See application file for complete search history.

(56) References Cited

U.S. PATENT DOCUMENTS

| | | | | |
|---|---|---|---|---|
| 8,489,995 | B2 * | 7/2013 | von Eicken et al. | 715/735 |
| 8,769,202 | B1 * | 7/2014 | Soundararajan et al. | 711/118 |
| 8,898,664 | B2 * | 11/2014 | Bhandari et al. | 718/1 |
| 8,924,658 | B1 * | 12/2014 | Bairavasundaram et al. | 711/154 |
| 2008/0262890 | A1 * | 10/2008 | Korupolu et al. | 705/8 |
| 2011/0153770 | A1 * | 6/2011 | Antani et al. | 709/208 |
| 2012/0036325 | A1 * | 2/2012 | Mashtizadeh et al. | 711/118 |
| 2013/0086324 | A1 * | 4/2013 | Soundararajan et al. | 711/122 |

* cited by examiner

*Primary Examiner* — Aaron Strange
(74) *Attorney, Agent, or Firm* — Gilliam IP PLLC

(57) ABSTRACT

It is detected that a metric associated with a first workload has breached a first threshold. It is determined that the first workload and a second workload access the same storage resources, wherein the storage resources are associated with a storage server. It is determined that the metric is impacted by the first workload and the second workload accessing the same storage resources. In response to a determination that the metric is impacted by the first workload and the second workload accessing the same storage resources, a first virtual cache appliance is instantiated and one of the first workload or the second workload is routed through the virtual cache appliance. Routing one of the first workload or the second workload through the first virtual cache appliance causes the first virtual cache appliance to cache data associated with the storage resources.

34 Claims, 11 Drawing Sheets

DYNAMIC INSTANTIATION AND MANAGEMENT OF VIRTUAL CACHING APPLIANCES

FIELD

Embodiments described are related generally to management of networked storage, and embodiments described are more particularly related to managing a multi-tiered caching system in a virtualized environment.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, NetApp, Inc., All Rights Reserved.

BACKGROUND

Data for companies or other organizations is commonly stored in networked storage. The networked storage and its associated compute resources can be referred as a data center. The resources of a data center such as storage and access bandwidth are limited. Thus, a common goal for a data center is to improve utilization of the resources of the networked storage, to improve storage utilization and access throughput. Data access to storage is typically slow relative to computer processing speeds. There may be applications within the company or organization that generate large workloads, making many access requests to the data center. Additionally, the number of workloads and the number of requests for each workload can vary significantly over time. Frequently there are levels of services that are either guaranteed or at least expected for workloads accessing the networked storage.

Workloads accessing data from networked storage often have performance requirements for such access; commonly referred to as service level objectives (SLOs). There is an apparent conflict in a system that has dynamic behavior between providing high resource utilization and meeting service level requirements. If an administrator allocates enough resources to guarantee the needs of service level requirements, the allocation of resources generally results in low resource utilization when workload requests are low. If an administrator allocates fewer resources to try to achieve higher resource utilization, the system may frequently violate service level objectives for the workloads. Furthermore, configuring resource allocation to be dynamic based on historical resource utilization only allows dynamism for general trends of work, and does not address specific workload requests. Such a dynamic system would still be unable to respond to dynamic shifts in workloads, especially if those shifts are outside expected historical trends.

SUMMARY

A service level objective (SLO) violation is detected for a workload of a networked storage system, based on a performance metric not being satisfied for the workload. In response to detecting the SLO violation, a controller determines that changing a level of caching at a node of the networked storage system will improve the performance metric for the workload. The controller implements the change by adjusting an operation of a virtual cache appliance (VCA) of the networked storage system. The adjusting can be instantiating a new VCA, or adjusting the level of caching at an existing VCA. The adjusting can be for caching related to the workload itself, or it can be caching for an interfering workload.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a networked storage system includes a storage server and at least one compute server. At least one compute server supports a dynamically resizable virtual cache appliance (VCA). The storage system includes VCA management components (collectively, a VCA controller)

that monitor, analyze, and execute VCA adjustments to dynamically respond to service level objective (SLO) requirements of the storage system. In one embodiment, the VCA management components can be implemented on a single hardware and/or virtual device of the storage system. In another embodiment, the VCA management components are distributed in the storage system over multiple hardware devices and/or virtual devices of the storage system.

The VCA management monitors performance with respect to workloads in the storage system by monitoring one or more performance metrics for each workload. If a performance metric is not being satisfied for a workload, the VCA management determines an SLO violation has occurred. In response to the detected SLO violation, the VCA management performs computations related to determining if caching changes will improve the performance metric, and thus improve or cure the SLO violation. When the VCA management determines that changing caching in the storage system will improve the performance metric, the VCA management adjusts an operation of VCA. The adjusting can be instantiating a new VCA, or adjusting the level of caching at an existing VCA. The adjusting can be for caching related to the workload itself, or it can be caching for an interfering workload. Additionally, when monitoring mechanisms detect that a VCA is no longer needed, adjusting an operation of a VCA can include removing the VGA, or adjusting the level of caching at the VCA. The storage system thus monitors workload performance and resource utilization, and dynamically adjusts operation based on the monitoring; thus, the storage system dynamically responds to changes in workload.

Figure 1:
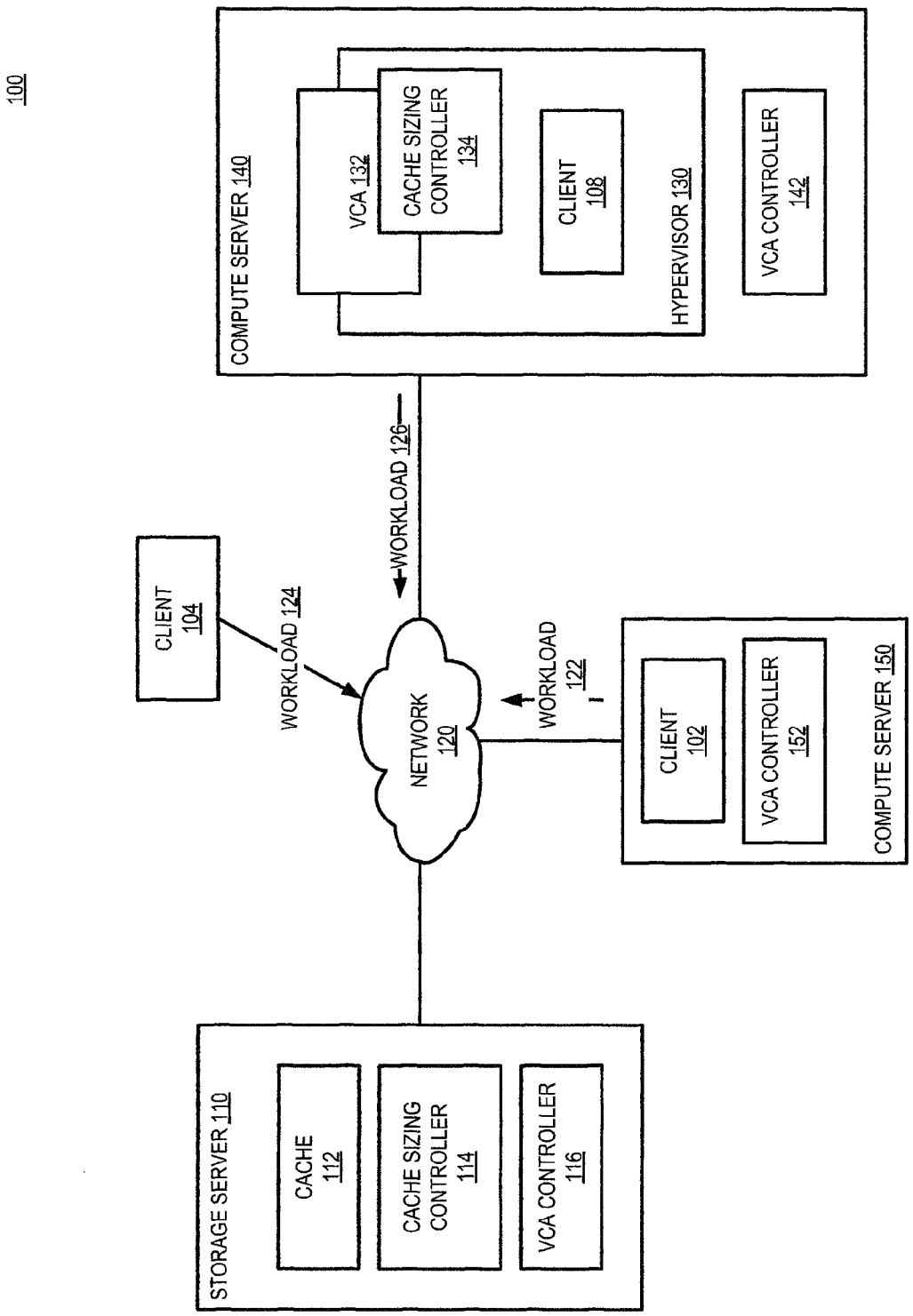
FIG. 1 is a block diagram of an embodiment of a storage system with a storage server and multiple compute servers that can dynamically adjust caching in the system.

FIG. 1 is a block diagram of an embodiment of a storage system with a storage server and multiple compute servers that can dynamically adjust caching in the system. System 100 is a storage server system or networked storage system that provides data access from storage attached (not shown) to storage server 110 to clients that connect from host 140. The clients make data access requests via applications. The data access requests can also be referred to as I/O (input/output) requests, and can be to read and/or write data to the storage managed and served by storage server 110.

System 100 illustrates a storage system with dynamically adjustable caching. In one embodiment, system 100 is a multi-tiered cache system, with a hierarchy of cache levels or cache tiers that can communicate with each other. Cache 112 is a lowest tier or tiers of cache in the cache hierarchy. As used herein, "tier" refers to the separation of the control logic within the multi-tiered cache system. Each tier includes a caching device, which includes storage or memory and a feedback/sizing controller or logic 116 to determine how caching is to be performed at the specific tier. It will be understood that alternative terms such as "level" or "layer" could also be used to refer to the separate tiers.

White different levels of caching are possible, examples of cache tiers include cache 112 of storage server 110, and VCA 132 of compute server 140. In one embodiment, cache 112 can be implemented as a storage server SSD (solid state drive) cache tier, referring to an SSD or flash device on storage server 110, and a storage server buffer cache tier. VCA 132 could also be separated into multiple tiers. The different cache tiers can be shared across clients and workloads, or dedicated to a specific client or workload.

The storage server connects to VCA 132 via network 120. Network 120 can be any type or combination of local area networks or wide area networks. VCA 132 is instantiated on hypervisor 130 that is on compute server 140. Alternatively, VCA 132 can be instantiated on another hypervisor (not shown), which is on a compute server that is physically close to compute server 140. In one embodiment, compute server 140 hosts hypervisor 130. A compute server can be physical server with a hypervisor, or a server instance of networked hardware. Physically close refers generally to the idea that a local area network or a local connection is used to connect the devices, rather than connecting over a wide area network. As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

VCA 132 is typically populated as compute server 140 reads data from the source storage server 110. On the first read of any data, the cache fetches data from storage server 110, stores it in VCA 132 and forwards it to client 108. As the reads pass through VCA 132, the cache fills up. Any subsequent access of the data that is stored in VCA 132 can be immediately served from the dynamic cache, which reduces the roundtrip time or the latency. In one embodiment, VCA 132 acts like a write-through cache, where all writes from compute server 140 are passed directly to storage server 110. Only when storage server 110 responds to a write request, VCA 132 acknowledges the result to compute server 140 or other cache tiers—e.g., RAM (buffer cache) and SSD or flash. Similarly to VCA 132, cache device 112 within storage server 110 caches data to serve to VCA 132, avoiding access to storage resources for data that is cached within storage server 110.

Storage server 110 further includes cache sizing controller 114, which represents the control logic of storage server 110 related to determining when a workload characteristic change occurs, or when the working set size has changed, whether there is overlap or interference between working sets of two workloads, and when to propagate these changes to cache sizing controller 134 of VCA 132. Working set refers to a set of data being cached due to an application accessing the data. Working set size is the amount of unique data (e.g., unique block addresses) accessed by a client (pr upstream caching tier) in a defined period of time. The time is measured either as wall clock time (e.g., a number of seconds or minutes), or as an amount of total (unique and repeat) data access. Controllers 114 and 134 can determine how to adjust cache size based on indications from the other controller. Controller 114 can be implemented as part of other control logic of the storage server, or it can be implemented as separate control logic (whether virtually (e.g., code), or physically (e.g., hardware) separate).

In one embodiment, controller 134 is implemented outside the virtual machine (VM) that contains VCA 132. For example, controller 134 could be a separate virtual entity of hypervisor 130. It will be understood that a virtual machine refers to a software environment instance (or virtual environment) that executes on hardware resources shared with other virtual environments. The allocation of hardware resources to virtual environments is typically performed by a virtual machine manager or hypervisor, which maps resource requests from the virtual environments to physical hardware resources.

As illustrated, in one embodiment, storage server 110 includes VCA controller 116, compute server 140 includes VCA controller 142, and compute server 150 includes VCA controller 152. The various controllers 116, 142, and 152 can all be different controllers, or simply different components of the same controller. Typically, system 100 will only have a single controller, whether implemented at a single location of system 100, or whether distributed. Similarly to controllers 114 and 134, controllers 116, 142, and 152 can each be implemented as part of another controller, or as separate components. They can also be implemented within a VM that interfaces to a client, or outside any VM that receives client requests. In one embodiment, the cache sizing controller and the VCA controller of a particular compute server are part of a single controller. For example, cache sizing controller 114 can be part of VCA controller 116. In one embodiment, the VCA controller is a virtual machine executing on a hypervisor. Thus, for example, VCA controller 142 can be part of hypervisor 130 or reside on hypervisor 130.

System 100 includes at least one monitoring component or monitoring infrastructure that collects statistics related to SLO performance. There can be a single monitor component to collect statistics for all workloads in system 100. In one embodiment, each compute server of system 100 collects statistics for its workloads. In one embodiment, system 100 includes multiple monitoring components, which monitor multiple workloads, but not necessarily those of a particular compute server. The monitoring infrastructure can be implemented, for example, as a monitor daemon that collects statistics related to workload characteristics (e.g., read-write ratio, random-sequential ratio, I/O size, working set size, heavily accessed block ranges), resource utilization within the storage server and the VCA (e.g., CPU usage, disk or SSD traffic, cache hit rate, number of cache pages touched, or other utilization indicators), or other performance or SLO statistics (e.g., latency, throughput). Monitoring needs visibility into I/Os in system 100; thus, there can be an advantage to placing monitoring functions on storage server 110, which has access to I/O from all clients. Alternatively, monitoring activity can be distributed to compute servers that have visibility into I/O generated by clients located on them. As another alternative, I/O information can be sent to a compute server or virtual machine that is set up to perform monitoring.

System 100 includes at least one analysis component that determines what actions to take if an SLO violation is detected. In one embodiment, there is one analysis component located on storage server 110. In one embodiment, there is one analysis component located on one of the compute servers. In one embodiment, there are multiple analysis components distributed throughout system 100. In one embodiment, compute server 150 represents a compute server that is dedicated only to monitoring or analysis or both (a "storage management server").

Thus, as illustrated, VGA controller can refer to any or all of the monitoring and/or analysis functions (the control functions) described above. Any server in system 100 can include some portion of the VCA control functions. One or more of the servers can be implemented without any portion of the VCA control functions. In one embodiment, monitoring is performed at storage server 110, while analysis is performed at one or more of compute servers 140 or 150.

System 100 also illustrates different ways that storage server 110 can experience multiple workloads. Workload 122 and workload 124 come to storage server 110 through a channel other than VCA 132. More particularly, clients 102 and 104 access storage server 110 over a different network path or via a different host than compute server 140. Clients 102 and 104 can be considered to access storage server 110 directly and not via a VCA, whereas the access of client 108 is through VCA 132. Workload 126 comes to storage server 110 via VCA 132, from client 108.

The workloads are separate or distinct from each other because the have different sources, or they originate from different applications or different clients. Thus, each set of requests from a different application can be referred to as a distinct workload. The different workloads 122, 124, and 126 could access either the same or different storage object such as a volume on the storage server. Depending on whether the different workloads are accessing the same or different volumes, the storage server experiences a certain resultant workload characteristic at its end.

There are many different possible protocols that could be used by the devices of system 100 to communicate. In one embodiment, the client can issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client can issue packets including block-based access protocols, such as the Small Computer Systems Interface (SCSI) protocol encapsulated over TCP (iSCSI) and SCSI encapsulated over Fibre Channel (FCP), when accessing information in the form of blocks.

VCA controllers 116, 142, and 152 implemented in accordance with any of the single-device or distributed models described above (collectively, the VCA controller of system 100), make a determination of whether changing a caching level at a compute server in system 100 will improve a performance metric associated with a workload's SLO. For example, assume the VCA controller of system 100 determines that the access latency for reads associated with workload 126 are below a value indicated in an SLO predefined for workload 126. In response to such a determination, the VCA controller of system 100 can determine whether adjusting a caching level within system 1100 will improve the access latency for workload 126.

It will be understood that a caching adjustment can directly or indirectly affect the SLO performance of a workload. For example, in one embodiment, the VCA controller of system 100 determines that adjusting caching in compute server 140 (through which workload 126 passes) will improve the access latency of workload 126. Alternatively, in one embodiment, the VCA controller of system 100 determines that adjusting caching in compute server 150, such as instantiating a VCA to buffer workload 122, will improve the access latency of workload 126. there may be reasons, for example, to instantiate a new VCA in compute server 150 (for example, if workload 122 is also close to the maximum or minimum of an SLO performance metric), rather than increasing a caching capacity at compute server 140. Alternatively, compute server 140 may not have additional resources to allocate to increase caching in VCA 132, and thus, adjusting caching at a different compute server would be the only way to potentially improve the access performance for workload 126.

Figure 2:
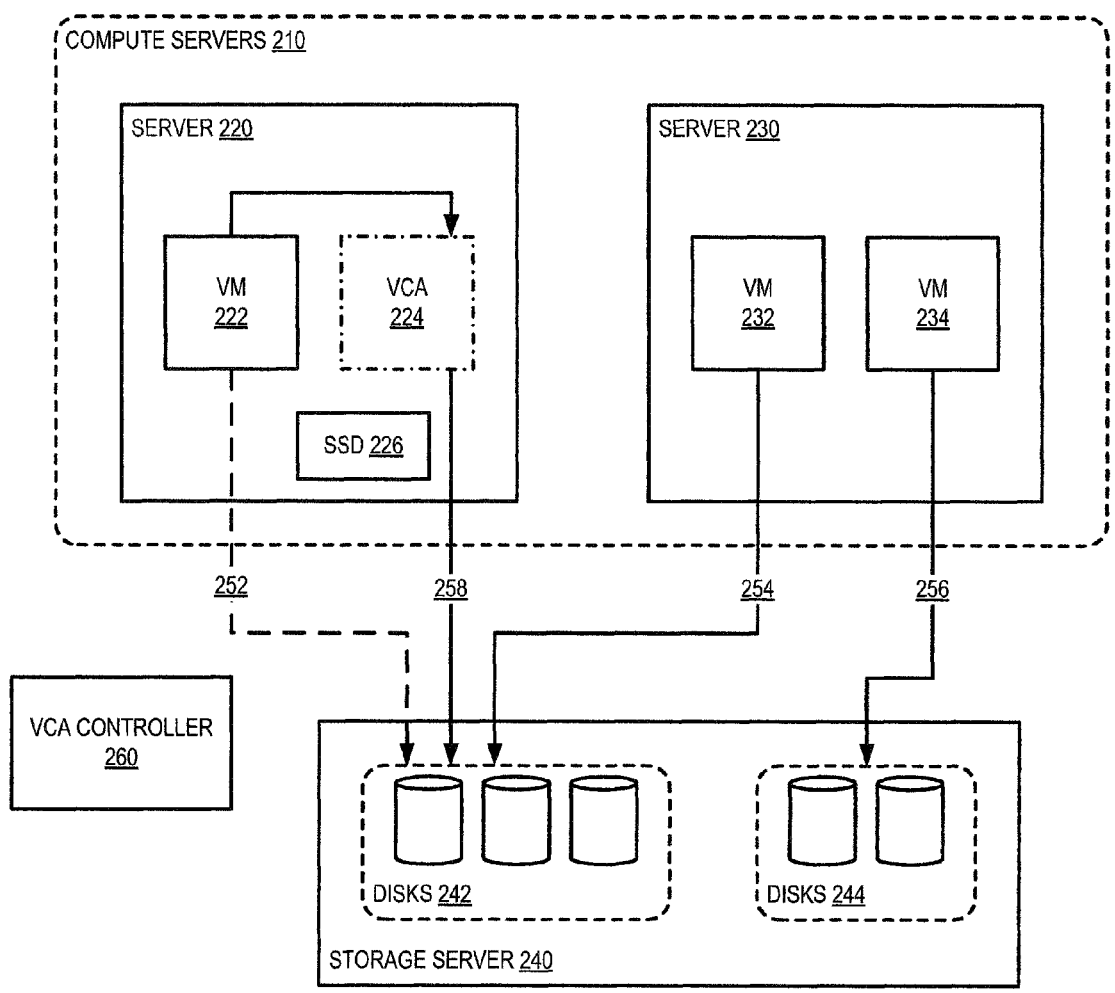
FIG. 2 is a block diagram of an embodiment of a virtual caching adjustment at a compute server to cure a service level objective violation.

FIG. 2 is a block diagram of an embodiment of a virtual caching adjustment at a compute server to cure a service level objective violation. System 200 illustrates an example of a scenario where a VCA is dynamically instantiated to handle an SLO violation. System 200 can be, for example, an embodiment of system 100 of FIG. 1. System 200 includes compute servers 210, of which server 220 and server 230 are specifically shown. Server 220 includes VM (virtual machine) 222, and server 230 includes VM 232 and VM 234. System 200 includes storage server 240, which is network-attached to server 220 and server 230. System 200 also includes VCA controller 260, which can be implemented by a compute server 210, by storage server 240, or in a distributed manner as described above.

VM 222 and VM 232 share disks 242, while VM 234 accesses a different set of disks 244. Thus, workload 252 and workload 254 access overlapping storage space, while workload 256 does not. It will be understood that an SLO can be associated with a specific workload, and/or can be associated with a VM. For purposes of system 200, assume each VM 222, 232, and 234 have an associated SLO for their respective workloads 252, 254, and 256. Assume that due to a change in workload 254, system 200 is not meeting the SLO for VM 232. System 200 performs an analysis (e.g., via a VCA controller 260) to determine what can be done about the detected SLO violation for VM 232.

In system 200, VM 222, VM 232, and VM 234 could all interfere with each other. For example, all of the VMs could interfere if there is a memory bottleneck on storage server 240; while VM 222 and VM 232 could interfere due to a disk bottleneck, given that they share the same underlying disks. In one embodiment, VCA controller 260 determines co-location by using a set of experimental performance samples and applying a statistical approach to determine the correlation between the metrics of different workloads. Assume for the example here that VCA controller 260 identifies VM 222 and VM 232 as interfering workloads. In one embodiment, VCA controller 260 then identifies the subset of cacheable workloads, which are workloads that can be offloaded using a cache. For example, VCA controller 260 can be programmed with a set of rules to filter workloads based on best-practices (e.g., for a write-through cache, workloads with a high fraction (>20%) of write I/Os will not benefit from caching).

Assume that VCA controller 260 determines workload 252 is cacheable, but workload 254 is an uncacheable workload. Thus, VCA controller 260 identifies workload 252 as a candidate for caching, but removes workload 254 from consideration for a caching adjustment. After filtering for cacheable workloads, VCA controller determines an appropriate size for a VCA to offload a sufficient amount of I/Os to correct the SLO violation. In one embodiment, VCA controller 260 uses a cache sizing tool that uses historical working set size estimates gathered by storage system 240 to build a cache miss-ratio curve. The miss-ratio curve indicates the fraction of I/Os sent to underlying storage system 240, i.e., cache misses, for various cache sizes. Using the miss-ratio curve, VCA controller 260 can estimate the performance impact on the SLOs of each workload of system 200. More particularly, VCA controller 260 can utilize an SLO impact analyzer to determine the impact of the residual workload, or the workload after instantiation of VCA for the primary workload (252) as well as the co-located workloads in the underlying storage system. VCA controller 260 can also estimate the performance expected to be provided by the VCA.

In one embodiment, based on criteria described above, or through other calculations, VCA controller 260 generates a list of potential caching solutions. In one embodiment, VCA controller 260 includes a policy or rules related to use of resources, cost constraints, and/or other criteria, to rank potential caching solutions. VCA controller 260 can select a highest-ranked potential solution as the solution to execute to cure the SLO violation.

Assume, for example, that VCA controller 260 determines that VM 222 obtains a miss-ratio of 50% for a 4 GB cache, 25% for an 8 GB cache, and 20% for a 16 GB cache. If however, VCA controller 260 determines that sending 50% of traffic from VM 222 to storage server 240 will not solve the SLO violation, VCA controller 260 may discard an option of creating a 4 GB cache. Similarly, if an administrative policy of VCA controller 260 indicates a preference to reduce resource cost, an option to create an 8 GB cache would be ranked higher than an option to create a 16 GB cache. Thus, in accordance with these examples, VCA controller 260 determines to create an 8 GB cache, and determines that it should be instantiated on the same compute server as VM 222 (compute server 220).

Thus, VCA controller 260 can dynamically create VCA 224 on compute server 220, such as with the memory on the compute server and/or with SSD 226. VCA 224 is an 8 GB cache to reduce the load on storage server 240 in accordance with the example. Workload 252 is re-routed through VCA 224. Workload 252 is removed, and workload 258 represents workload 252 as routed through VCA 224, and will be of a reduced load on storage server 240 as compared to workload 252. Reducing the load on storage server 240 enables system 200 to meet the SLO requirements for 232.

The scenario described above could illustrate a reactive caching adjustment. In one embodiment, detecting an SLO violation refers to proactively determining that based on historical performance, an SLO violation is imminent. For example, historical data may indicate that a particular workload changes dramatically due to a change to known peak hours. Thus, as described herein, caching adjustment can be performed reactively to actual detected violations, as well as proactively to expected violations.

Figure 3:
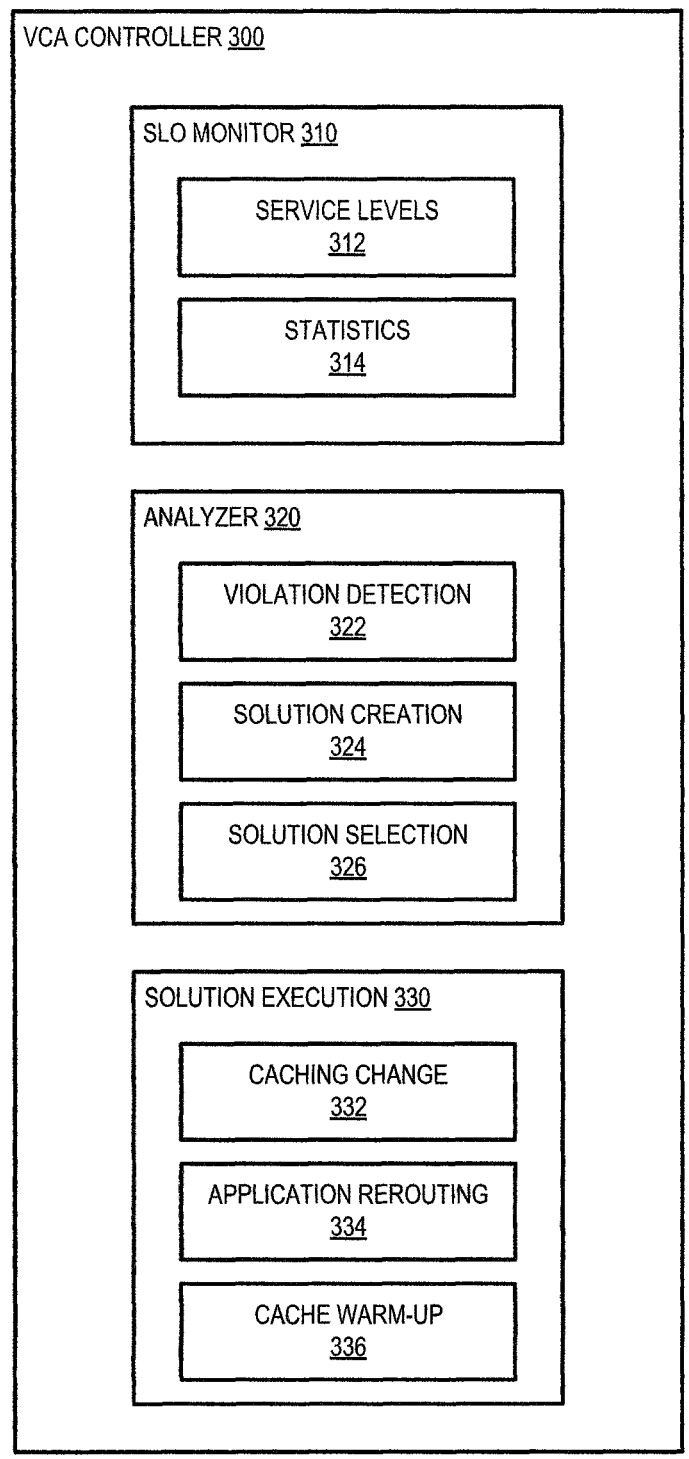
FIG. 3 is a block diagram of an embodiment of a virtual cache appliance controller.

FIG. 3 is a block diagram of an embodiment of a virtual cache appliance controller. As described above with respect to FIGS. 1 and 2, a VCA controller can be implemented on a single device, or it can be distributed. In one embodiment, VCA controller 300 includes SLO monitor component 310, analyzer component 320, and solution execution component 330. Any element in any drawing herein labeled "VCA controller" includes at least one of the components (310, 320, 330) of VCA controller 300. Thus, the VCA controllers illustrated herein can refer to any part of VCA controller 300, or all parts illustrated VCA controller 300.

In one embodiment, SLO monitor 310 includes service levels 312. Service levels 312 indicate levels predetermined for a workload, client, or VM associated with a workload. Service levels 312 are typically represented as values that represent a minimum, maximum, average, or other statistical metric for a particular characteristic of performance for the workload such as latency of data access or throughput for accesses. Statistics 314 represent runtime monitoring of the characteristics of performance, additional workload characteristics related to performance, and resource utilization statistics, Statistics are generated or gathered by SLO monitor 310 as a workload generates I/O. Workload characteristics that can be the subject of an SLO and tracked can include read-write ratio, random-sequential ratio, I/O size, IOPS (I/O per second), working set size, heavily accessed block ranges, latency, throughput, or other characteristics related to data access. Resource utilization statistics can include metrics such as CPU utilization, disk or SDD traffic and utilization, cache hit rate, number of unique cache pages accessed, or other utilization statistics related to identifying how useful the current allocation of resources is. SLO monitor 310 can directly monitor the I/O of individual workloads, or receive the runtime statistics as monitored by another monitoring service.

In one embodiment, analyzer 320 includes violation detection 322, solution creation 324, and solution selection 326. Violation detection 322 enables analyzer 320 to compare service levels 312 with statistics 314 to determine whether an SLO violation occurs. Violation detection 322 can be a simple detection, comparing a predetermined value to a monitored value, with a violation detected if the monitored value is outside a range of the predetermined value. In one embodiment, violation detection 322 further includes historical data and timing detection. With historical data and timing detection, violation detection 322 can preemptively determine that a violation will occur, rather than just reactively detecting a violation. Preemptive determination works better with accurate trend data indicating specific patterns of workload changes.

Solution creation 324 enables analyzer 320 to generate multiple potential solution scenarios, similar to what is set forth above in the description of FIG. 2. Namely, analyzer 320 can first determine all possible choices of action within the storage system, and then filter down to a "best" choice based on policies and rules predefined by an administrator. Analyzer 320 generates a list or set of all possible choices based on system capabilities, such as available resources and allowable operations. Analyzer 320 filters the list down based on rules or policy indicating utility of a solution (e.g., whether or not the solution will have an effect, or enough of an effect) or preference of a solution (e.g., based on cost, resource utilization, or other administrative factors). Analyzer ranks the possible choices against each other to determine what action to take in response to the SLO violation detection.

Solution selection 326 enables analyzer 320 to make calculations or computations related to comparing the possible solutions and filtering them. In one embodiment, the filtering process can be considered the selection process. The solution decided upon by solution selection 326 can be different for different systems, even if the service levels and monitored performance statistics were exactly the same. The selection of a solution is thus controllable by the rules and preferences that can be edited or otherwise programmed into VCA controller 300 for a system implementation.

Solution execution 330 enables VCA controller 300 to implement a solution selected by analyzer 320. Solution execution 330 includes caching change 332, which represents all features and functions associated with instantiating a VCA or changing a level of caching at a VCA. In one embodiment, changing a level of caching can be performed by instantiating a cache of a different size than one currently available, rerouting all workload traffic through the new cache, and closing the original cache. Caching change 332 includes accessing a hypervisor that hosts a VM in which the VCA is or will be implemented.

Application rerouting 334 enables solution execution 330 to redirect traffic for a particular workload through the VCA as an access channel. Cache warm-up 336 enables solution execution 330 to load "hot" blocks into a newly-created VCA to reduce the time for rerouting. For example, assuming that a VCA is created to reduce an SLO violation related to access latency, it does not make much sense to reroute traffic through a cache that will then cause further access latency by a series of cache misses to load the requested blocks into the cache. Instead, the VCA can be warmed up by monitoring what blocks are frequently used by the workload, and then preemptively loading those into the cache as soon as it is instantiated. Then many of the initial access requests will be cache hits rather than cache misses.

VCA controller 300 is implemented on hardware resources of one or more of the servers in the networked storage system. Those hardware resources include at least processing components or processing resources and memory or storage resources. Additionally, VCA controller 300 can utilize network hardware resources to communicate with a compute server in which a VCA be created or changed.

Figure 4:
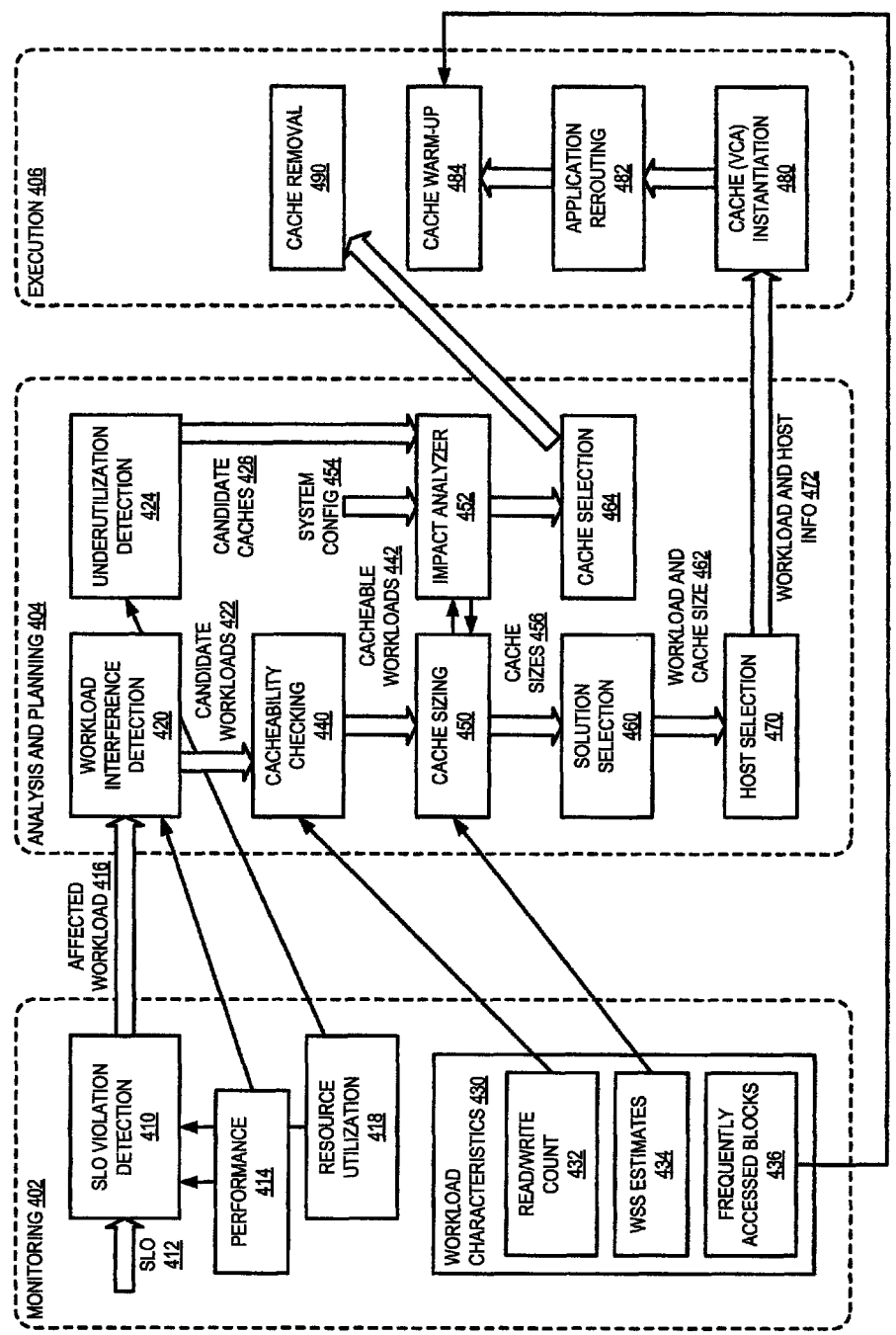
FIG. 4 is a block diagram of an embodiment of virtual cache appliance management by separate phases including monitoring, analysis and planning, and execution.

FIG. 4 is a block diagram of an embodiment of virtual cache appliance management by separate phases including monitoring 402, analysis and planning 404, and execution 406. Monitoring 402 represents a phase where the VCA controller (e.g., VCA controller 300) monitors workloads to gauge performance and to obtain workload characteristics. Analysis and planning 406 represents a phase where the VCA controller identifies interfering workloads and determines appropriate cache sizes. Execution 406 represents a phase where the VCA controller dynamically instantiates or changes a level of caching of a VGA, and reroutes traffic away from the overloaded storage system.

Monitoring 402 can include mechanisms for monitoring either SLO violation, or underutilization of allocated caching resources, or both. The performance monitor is to detect utilization of memory resources outside of a target utilization. For an SLO violation, the target utilization is that the SLO be satisfied. For underutilization, the target utilization is that system resource utilization not fall below a threshold. Thus, in one embodiment, monitoring 402 includes a performance monitor that is an SLO monitor to detect SLO violations. In one embodiment, monitoring 402 includes a performance monitor to detect underutilization memory resources in the storage system.

In either case, the performance monitor can monitor one or more performance metrics to determine whether utilization is within the target. For underutilization, performance metrics can be monitored for an entire VCA instance, or for multiple instances, and thus across multiple workloads. For SLO violations, the performance metrics are monitored specifically with respect to a particular workload.

Similarly to monitoring 402, analysis and planning 404 can include mechanisms for modifying a level of caching to dynamically adjust resource allocation to either cure an SLO violation, or cure underutilization, or both. For SLO violations, the modification is targeted to adjusting performance with respect to a specific workload. For underutilization, the modification is targeted to adjust performance across one or more caching devices (VCAs).

In monitoring 402, the VCA controller compares performance 414 against SLOs 412 for each monitored workload. SLO violation detection 410 is illustrated as being within monitoring 402, but could also be placed in analysis and planning 404. For example, consider the alternative example of FIG. 3 where violation detection 322 is within analyzer 320. The VCA controller can utilize both performance metrics and traffic metrics of each workload running on the storage system. In one embodiment, the VCA controller tracks performance numbers such as IOPS, average latency, and I/O request sizes. In one embodiment, the VCA controller can track additional workload characteristics 430 such as the read/write count 432 (the I/O request mix), working set size (WSS) 434 over different periods of time, and frequently accessed blocks 436.

In one embodiment, the VCA controller can track resource utilization 418, which includes characteristics relevant to performance. Such characteristics can include CPU utilization, disk or SSD traffic, cache hit rate, and the number of cache or memory pages touched (accessed). Tracking of resource utilization 418 enables the VCA controller to selectively remove VCAs from the system when resource utilization can be improved by eliminating them.

Whether SLO violation detection 410 is considered to be part of monitoring 402 or analysis and planning 404, detection of a violation triggers the VCA controller to perform an analysis. In one embodiment, the specifically affected workload 416 for which the VCA controller detected a violation is used to determine what interfering workloads exist in the storage system. Workload interference detection 420 enables the VCA controller to identify workloads that compete for the same resources on the underlying storage system as affected workload 416.

The VCA controller identifies candidate workloads 422 from interference detection 420. The candidate workloads are workloads that might be offloaded to affect the detected SLO violation. The VCA controller will attempt to offload either affected workload 416 or a co-located or interfering workload to free up resource utilization in the storage system and correct the SLO violation. In one embodiment, the VCA controller performs a cacheability check to determine if any of the candidate workloads are not good candidates for cache offloading. The VCA controller can use read/write count 432 to determine if a ratio of writes is too high for caching to be effective.

The VCA controller ends up with cacheable candidate workloads 442, which can then be further analyzed to generate possible solutions. In one embodiment, the VCA controller determines what size of cache would be needed with cache sizing 450. The cache sizing is directly influenced by the working set size, seeing that the cache size should typically be a predefined ratio of the overall working set size to be effective. In one embodiment, impact analyzer 452 determines from system configuration 454 (configuration of the storage server) what is the expected effect of different cache size changes.

The potential cache sizes 456 represent the possible solutions generated by the VCA controller. The VCA controller performs solution selection 460 to determine what cache size at what compute server will have the desired performance effect. In one embodiment, after determination, the VCA controller selects a workload and cache size 462 for cache offload. Host selection 470 represents the VCA controller identifying the host information of the selected workload to offload. In one embodiment, the VCA controller then implements cache instantiation 480 for the workload and host information identified 472. Alternatively, the VCA controller can resize a VCA.

In one embodiment, the VCA controller instantiates a cache 480 by obtaining a virtual machine image, configuring the memory and network settings, applying the appropriate licenses, and issuing a command to the hypervisor of the selected host to start the VCA. In one embodiment, once the VCA has started, the VCA controller reroutes (application rerouting 482) the network connections between the workload and the underlying storage system through the VCA. In one embodiment, in parallel to cache instantiation 480 and application rerouting 482, the VCA controller executes cache warm-up procedure 484 to fetch the most-frequently-used data into the cache from frequently accessed blocks 436.

The VCA controller can repeat the monitoring, analysis and planning, and execution for the same workload, and/or for other workloads as often as it detects SLO violations. Thus, the monitoring process continues for all workloads. If the cache usage behavior changes for a workload so that hit rates or other performance metrics are not met, the VCA controller can repeat the entire process for the current workload to either expand the memory used by the existing VCA or create a new VCA and reroute the application to use the new VCA.

In one embodiment, the VCA controller can remove a VCA, as mentioned above. In response to determining that resource utilization is tower than a predetermined threshold, the VCA controller can trigger underutilization detection 424. The predetermined threshold can be a percentage of resource utilization per time period, either on average or based on peaks, or could be a predefined number of cache accesses. The VCA controller can determine the number of cache accesses either on a cache-by-cache basis, or for a group of caches.

The VCA controller identifies a group of candidate caches 426 that may be underutilized, or that can be closed in response to detecting underutilization (if the controller determines underutilization by a mechanism that is not directly associated with a specific cache). In one embodiment, impact analyzer 452 determines from system configuration 454 (configuration of the storage server) what is the expected effect of removing different caches from the system.

The VCA controller performs cache selection 464 to determine what cache (VCA) removal at what compute server will have the desired performance effect. It will be understood that reference to removing a cache is specific to de-allocating a VCA. In one embodiment, the VCA controller removes a cache 490 by obtaining a virtual machine image, configuring the memory and network settings, applying the appropriate licenses, and issuing a command to the hypervisor of the selected host to terminate the VCA. In one embodiment, termination of the VCA may cause the VCA controller to need to reroute workloads, similar to what is described above for cache instantiation.

Figure 5:
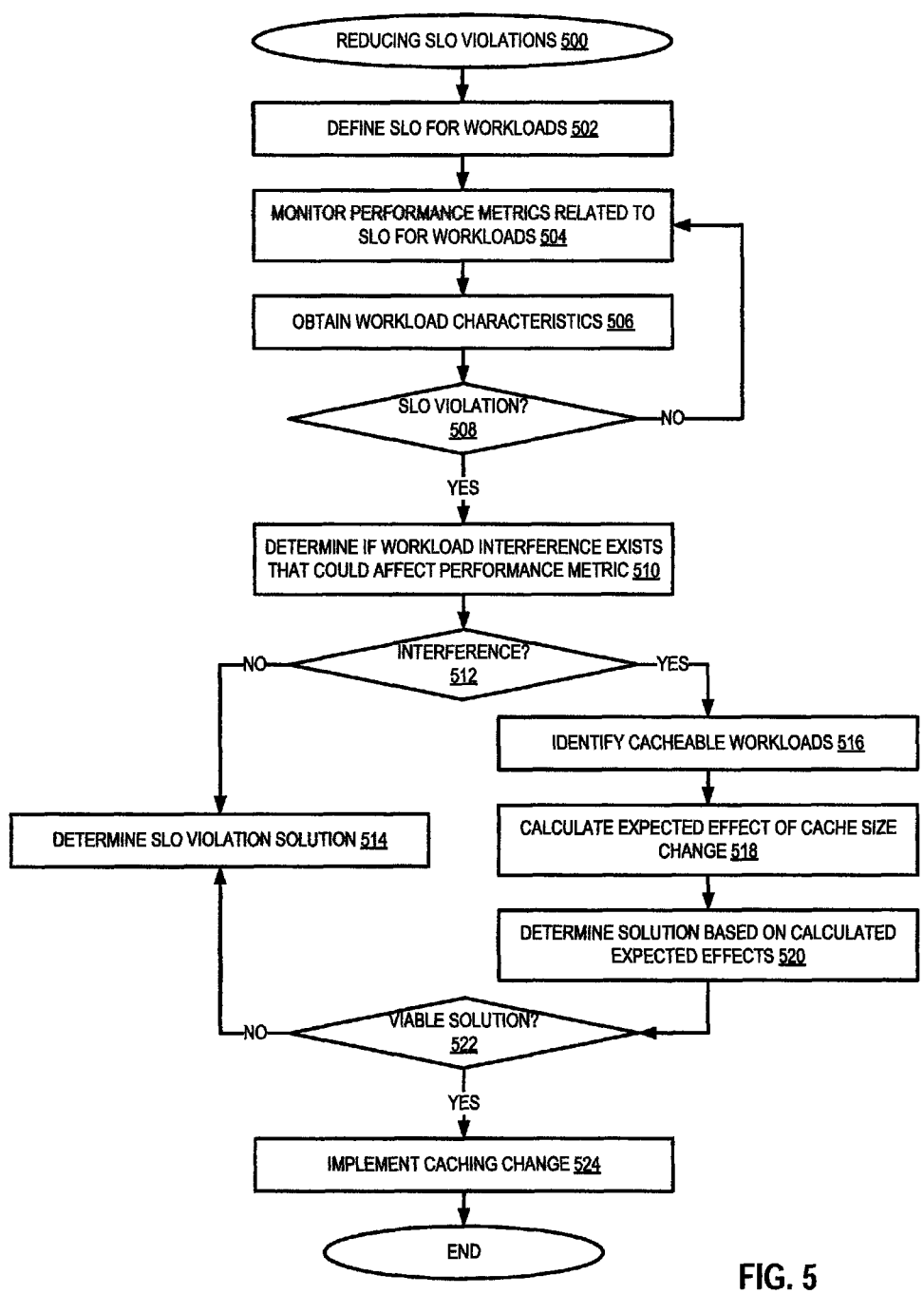
FIG. 5 is a flow diagram of an embodiment of a process for reducing service level objective violations.

FIG. 5 is a flow diagram of an embodiment of a process 500 for reducing service level objective violations. In one embodiment, an administrator for a system (e.g., system 100) defines SLO for workloads, process block 502. The defined SLO becomes part of the system data that will be used by a VCA controller (e.g., 300) to monitor workload performance by monitoring performance metrics related to the predefined SLOs for system workloads, process block 504. The VGA controller obtains workload characteristics by either directly monitoring such characteristics, or receiving them from a monitoring component, process block 506.

The VCA controller determines if an SLO violation occurs, process block 508, by comparing the expectations of the predefined SLO with the monitored performance. If there is no SLO violation, process block 508, the VCA controller continues monitoring at process block 504. If the VCA controller detects an SLO violation, process block 508, in one embodiment the VCA controller determines if workload interference exists that could affect workload performance, process block 510.

If there is no workload interference, process block 512, the VCA controller can determine an SLO violation solution, process block 514. Such a solution would involve either a caching change for the specific workload, or a change or solution that is outside the scope of what is discussed herein. If the VCA controller detects interfering workloads, process block 512, in one embodiment the VCA controller identifies cacheable workloads, process block 516. Cacheable workloads are workloads for which data access performance is expected to increase in response to caching some or part of the workload data.

In one embodiment, the VCA controller calculates an expected effect of a cache size change, process block 518. If cacheability is first checked, the VCA controller can calculate for the workloads determined to be cacheable. The VCA controller determines an SLO violation solution based on the calculated expected effects and/or other factors, process block 520. In one embodiment, the VCA controller checks all determined solutions for viability, process block 522. For example, a solution may not be viable if it requires resources that are not available in the system.

If the VCA controller does not find a viable solution, process block 522, the VCA controller can determine an SLO violation solution that does not include changing caching, process block 514. For a viable solution, process block 522, the VCA controller identifies a specific caching change, including a host on which the caching change will be implemented. The VCA controller implements the selected caching change, process block 524.

Figure 6:
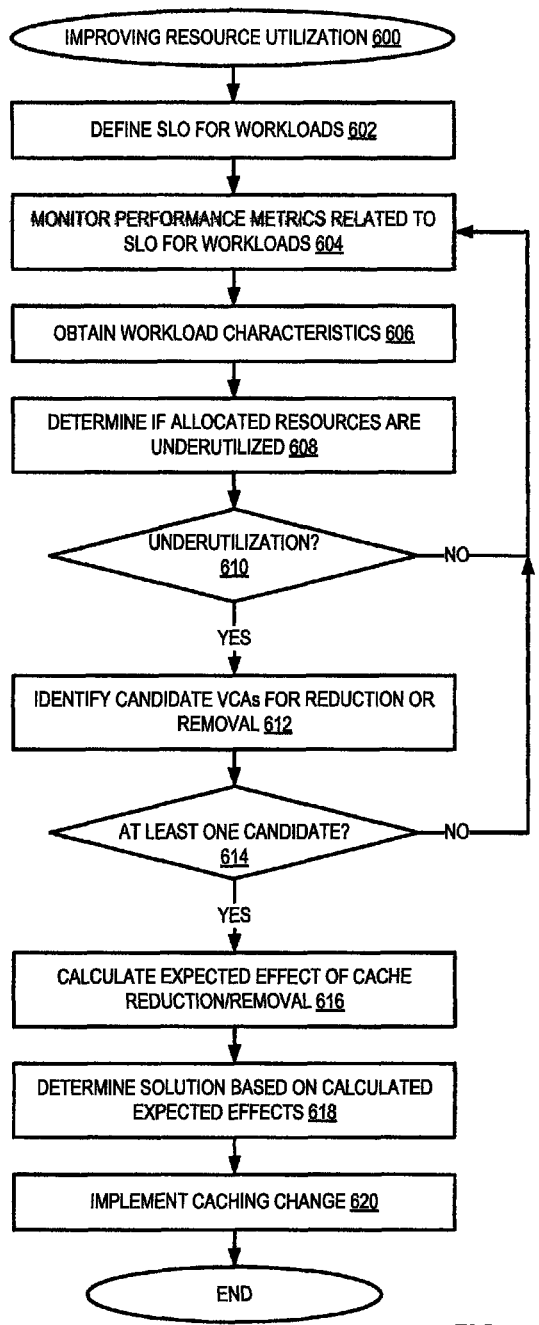
FIG. 6 is a flow diagram of an embodiment of a process for removing cache resources when resource utilization is low.

FIG. 6 is a flow diagram of an embodiment of a process for removing cache resources when resource utilization is low. In one embodiment, an administrator for a system (e.g., system 100) defines SLO for workloads, process block 602. The defined SLO becomes part of the system data that will be used by a VCA controller (e.g., 300) to monitor workload performance by monitoring performance metrics related to the predefined SLOs for system workloads, process block 604. The VCA controller obtains workload characteristics by either directly monitoring such characteristics, or receiving them from a monitoring component, process block 606.

The VCA controller determines if allocated resources are underutilized, process block 608, by comparing the expectations of the predefined resource allocations with monitored performance. If there is no underutilization, meaning the allocation of resources is proper, process block 610, the VCA controller continues monitoring at process block 604. If the VCA controller detects underutilization, process block 610, in one embodiment the VCA controller identifies candidate VCAs for reduction or removal, process block 612. In one embodiment, any VCA in the system can be a candidate for removal. In one embodiment, the VCA controller determines underutilization with respect to a specific VCA, or group of VCAs, which would then be the candidates. In one embodiment, only VCAs below a percentage of utilization are candidates.

If there is not at least one candidate, process block 614, the VCA controller continues to monitor performance metrics, process block 604. If there is at least one candidate VCA for reduction or removal, process block 614, the VCA controller calculates an expected effect of the reduction or removal of a cache, process block 616. The VCA controller determines a solution based on the calculated expected effects, process block 618. A solution includes specifically identifying a VCA to remove. Alternatively a solution includes specifically identifying a VCA to reduce, and an amount by which to reduce it. The VCA controller implements a change by removing a VCA calculated to be removable from the system, or reducing an amount of caching resources allocated to a VCA, process block 620. In one embodiment, when the VCA controller removes a VCA from the system, it also redirects one or more workflows from the VCA to be removed to another VCA or other caching mechanism.

In general, SLO-based VCA management as described herein provides a tow-latency, high-impact mechanism to dynamic changes in a system. Data access in a data center is often highly dynamic. As described above, a storage system with a VCA controller that monitors SLO performance can respond quickly to changes in a highly dynamic environment by changing behavior of the caching. Thus, better resource utilization is accomplished. VCAs can be dynamically instantiated, modified, and de-allocated by the VCA controller, which makes better use of hardware resources than having a dedicated hardware resource to perform the caching.

Dynamism in a data center can be the result of either or both of changes in workload needs over time, or changes in number of workloads over time. Changes in workload needs over time can manifest as peak requirements that are significantly different than normal or baseline or average requirements. It is not uncommon for peak requirements to be at least 10 times the normal requirements. Frequently the peaks in requirements occur in a periodic manner. Additionally, individual workloads can be created and removed over time, which is very common in cloud service environments where many virtual machines are created and/or destroyed every hour.

While it may be possible for smaller network environments to be monitored by human intervention to adjust for SLO violations, as network sizes scale upward, managing workloads via human intervention to handle every SLO violation or resource crunch is prohibitively expensive if not impossible. As alternatives, traditional management approaches typically include low-latency, low-impact techniques such as throttling, or high-latency, high-impact techniques such as data migration. As described herein, management by the VCA controller provides a low-latency, high-impact technique to handle changes in workload requirements, even in large network environments.

Thus, the monitoring and analysis architecture provided by the VCA controller provides a mechanism for meeting service-level objectives of workloads (or their associated applications) while utilizing only the resources needed. The improved resource utilization towers hardware, power, and management costs for customers.

The VCA controller leverages the availability of virtualized, elastic compute resources that can be allocated or discarded based on demand. The instantiation of virtual compute resources on demand shifts the resource requirements from storage server devices to compute nodes coupled to the storage server. Resources on compute servers are typically cheaper than those on storage servers. Further, resources on compute servers can be used more flexibly. For example, DRAM (dynamic random access memory) on compute servers can be used for the compute needs of applications as well as for the caching needs of a storage stack to create a VCA for a workload of an application.

In one embodiment, the VCA uses both memory and disk (or SSDs) to perform caching. In one embodiment, the data in volatile memory is a subset of the data on disk. In one embodiment, the VCA contemplated herein forwards writes to the storage server and locally invalidates the data blocks that are written to. In one embodiment, the VCA supports a read command that causes no data transfer to the client, but causes the data to be read internally. Such a command can be used by the VCA controller to warm up a newly instantiated VCA.

Figure 7:
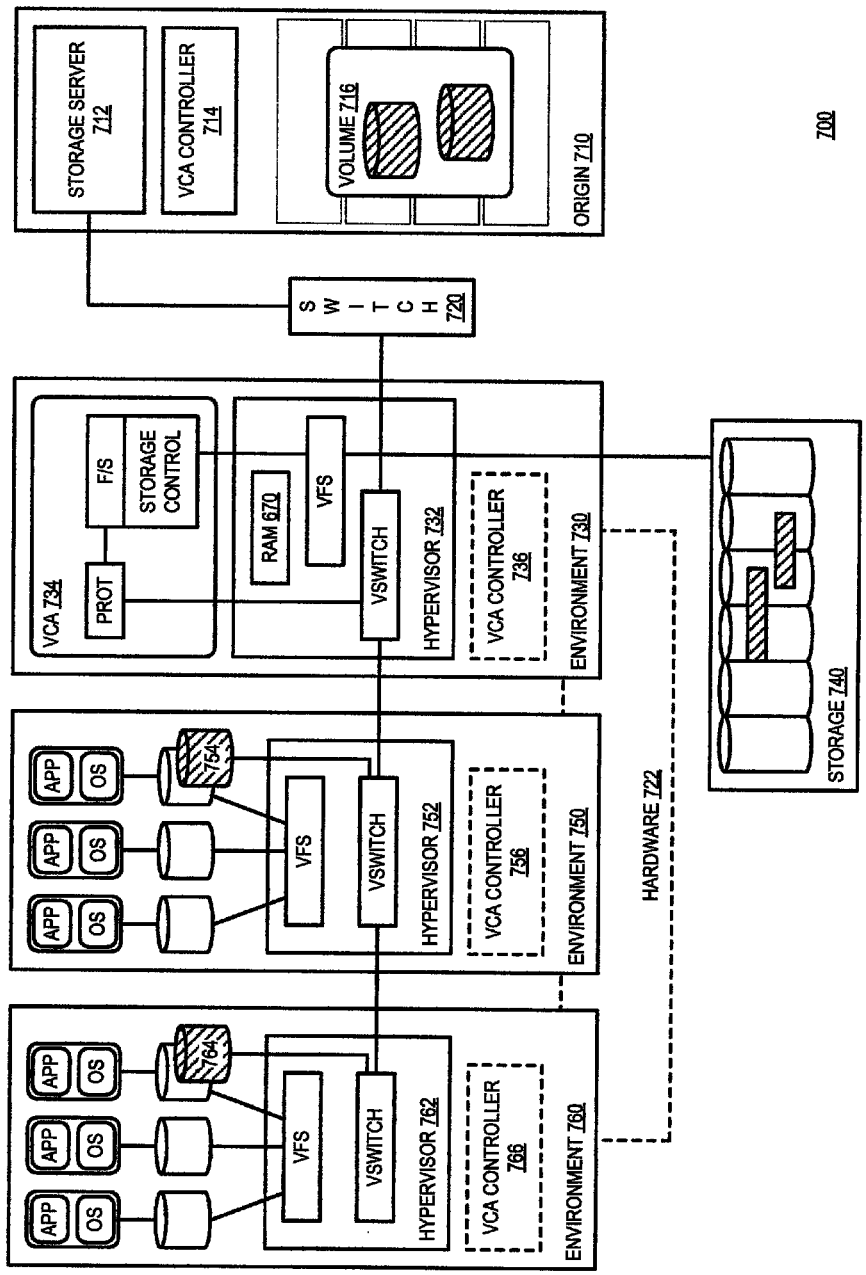
FIG. 7 is a block diagram of an embodiment of a storage server coupled to a virtual cache appliance instance.

FIG. 7 is a block diagram of an embodiment of a storage server coupled to a virtual cache appliance instance. System 700 includes dynamic cache origin 710, which represents an enclosure or backend system for which the VCAs act as caches. Generating the VCAs can be considered to "offload the origin" in that the VCA capabilities of the cache instance on other hardware can reduce the burden on the backend storage server.

Origin 710 includes storage hardware, including storage volume 716, which can be one or more logical grouping of data storage resources. In one embodiment, origin 710 is a blade enclosure with storage resources as well as storage server (controller) resources. Storage server 712 manages the storage resources of origin 710. Requests related to data stored at origin 710 are processed through storage server 712.

Switch 720 represents one or more network resources to allow remote access to storage server 712. As illustrated, switch 720 connects to virtual environments 730, 750, and 760, which are virtualized environments executing on hardware 722. Hardware 722 can represent a single instance of hardware resources on which the virtual environments execute, or there could be separate hardware systems for each virtual environment.

Virtual environment 730 includes VCA 734 executing on hypervisor 732, which acts as a cache tier for storage server

712. Hypervisor 732, as well as hypervisors 752 and 762 of virtual environments 750 and 760, respectively, includes a virtual switch (Vswitch) and a virtual environment filesystem (VFS). Other virtual and/or real environments could also be executed on hardware 722. The virtual switches provide access via the hypervisor to hardware switching resources used to connect to the physical resources of origin 710, and the other virtual environments connected to VCA 734. In one embodiment, hypervisor 732, 752, and 762 are all the same hypervisor, with VCA 734 and virtual environments 750 and 760 being different VMs executing on it. Each OS and App combination shown can be considered a separate VM; these VMs can also be executed on the same hypervisor in an embodiment where hypervisors 732, 752, and 762 are all the same hypervisor. As is understood by those skilled in the art, the applications and operating systems of each virtual environment access the virtual switch of the respective virtual environment as though the switch were actual hardware. The virtualization controller (hypervisor) manages the mapping of virtual resources to hardware resources, for the virtual switches as well as other virtualized physical resources.

In one embodiment, virtual environment 730 hosts VCA 734, and virtual environments 750 and 760 host access to clients. As illustrated, environments 750 and 760 are configured identically, with multiple operating system (OS) instances and application instances connecting to the corresponding hypervisor (752 and 762). The configurations do not necessarily have to be identical. In one embodiment, each operating system of virtual environments 750 and 760 represents a separate virtual machine (VM), and there can be one or more applications executing on each operating system. The applications could each represent one or more clients. The virtual switch of each virtual environment 750 and 760 presents an instance representation (754 and 764, respectively) of storage volumes 714 of origin 710.

In one embodiment, the applications are multiple individual threads. In one embodiment, each thread is considered a workload, or one thread is considered an application. The applications are dynamic, and can be opened and closed dynamically, as well as dynamically changing what data and how much data they access.

In one embodiment, VCA 734 is implemented as an instance of an operating system the same or similar to the one executed on storage server 712. Thus, storage server 712 executes a storage server OS natively, while the storage server OS executes virtually on hypervisor 732, hosted remotely from origin 710. Storage server 712 is local to storage volumes 716, while VCA accesses storage volumes 716 remotely via switch 720. Storage resources 740 represent the physical storage resources for virtual environments 730, 750, and 760. In one embodiment, storage resources 740 could be considered part of hardware 721.

VCA 734 includes protocols and associated drivers and network stacks to communicate over the virtual switch of hypervisor 732. In one embodiment, VCA 734 includes at least NRV and NFS as supported protocols. In one embodiment, origin 710 can be a Fabric Attached Storage (FAS), and export storage volumes to VCA 734 over the NRV protocol. VCA 734 can then serve the cached volumes to clients of virtual environments 750 and 760 over the NFS protocol.

VCA 734 also includes a filesystem as well as drivers and management resources for storage 740. A combination of storage 740 and RAM 770 of the hypervisor/host (part of hardware 722) act as the caching device for VCA 734. Because the VCA cache tier is dynamic, space from both DAS 740 and RAM 770 of the hypervisor can be carved out to implement the VCA tier as a dynamic resource. In one embodiment, VCA 734 controls all storage access for all VMs of virtual environments 750 and 760. Data accessed from storage volumes 716 is cached in storage resources 740, and presented as instances 754 and 764 to virtual environments 750 and 760, respectively, by the virtual switches of the respective environments. Each VM can store local data in addition to the data of storage volumes 716.

As mentioned above, VCA 734 can respond to dynamic behavior of different workloads, which are represented either directly or indirectly by the applications of the VMs of virtual environments 750 and 760. The dynamic behavior of the VCA is controlled in one embodiment by a VCA controller (e.g., 714, 736, 756, 766). The various elements labeled VCA controller could be portions of a single distributed VCA controller, or VCA controller could be implemented at any one of the locations illustrated. As discussed above, VCA controller monitors workload performance in system 700, and makes determinations about dynamically changing caching within system 700. VCA 734 or another VCA could be instantiated or changed in size. In response to a reduction in workload requirements, a VCA could also be resized smaller or entirely de-allocated.

Figure 8:
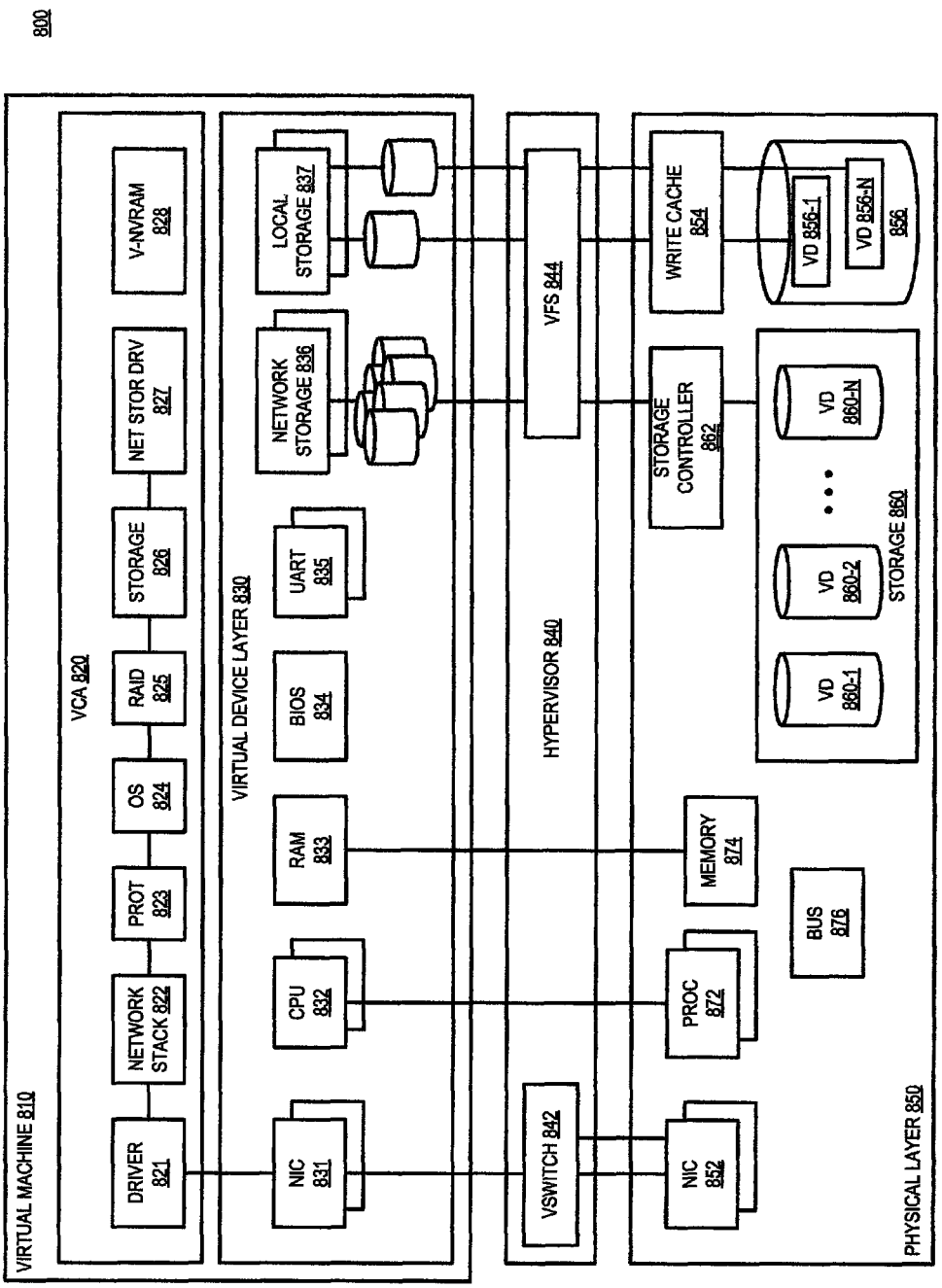
FIG. 8 is a block diagram of an embodiment of a virtual storage server.

FIG. 8 is a block diagram of an embodiment of a virtual storage server. System 800 is a representation of a virtual environment (e.g., environments 730, 750, 760 of FIG. 7). Physical layer 850 includes the hardware resources that execute virtual machine 810, via hypervisor 840. Hypervisor 840 can be implemented as any virtualization engine, and includes virtual switch 842 and virtual filesystem 844. Virtual switch 842 maps network and communication resources from virtual device layer 830 to hardware resources of physical layer 850. Similarly, virtual filesystem 850 represents one or more filesystem resources that map networked (shared) storage resources and local (non-shared) storage resources of physical layer 850.

Physical layer 850 is depicted with various components that can be present in whole or in part, and additional components or subcomponents can also be present. Physical layer 850 includes one or more processors or processing resources 872, which execute instructions and can perform various operations as described herein. Processor 872 can include any type of microprocessor, central processing unit (CPU), processing core (including multi-core devices), or other processing devices.

Memory 874 represents the main memory for system 800, and provides temporary storage for code (e.g., software routines or series of instructions, commands, operations, programs, data) to be executed by processor 872. Memory 874 can include read-only memory (ROM), flash memory, one or more varieties of random access memory (RAM), or the like, or a combination of such devices.

The various components of physical layer 850 can be coupled by one or more buses 876. Bus 876 is an abstraction that represents any one or more separate physical buses, communication lines, and/or point-to-point connections, connected by appropriate bridges, adapters, and/or controllers. Therefore, bus 876 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Physical layer 850 includes one or more network interfaces (NIC) 852, which represent hardware and software (e.g., drivers) that enable physical layer 850 to connect and communicate with remote devices over one or more networks. In one embodiment, physical layer 850 includes storage resources separated as local to a particular virtual environment, and other shared data (e.g., shared or cached data for a VCA). For example, storage resources 860 represent the cached data shared among multiple virtual environments, while storage 856 represents local storage.

Storage 856 includes resources for implementing a write cache 854, which is mapped by virtual filesystem 844 to virtual machine 810 to store the data written for various clients. Storage 856 can be separated into multiple virtual disks (VD) 856-1 through 856-M. The virtualization of disks is merely for purposes of storage management and organization, and can be performed in any way known in the art.

Storage 860 includes storage resources for implementing a virtual cache layer, with resources separated as virtual disks 860-1 through 860-N. Typically N will be an integer much larger than M. Controller 862 provides physical-tier management of the storage. The options for control or management of storage 860 vary widely, depending on the desired implementation. For example, controller 862 can be implemented as a JBOD (Just a Bunch Of Disks controller, a RAID (Redundant Array of Independent/Inexpensive Disks/Drives controller, or other controller.

Thus, it will be understood that storage 860, in addition to being a virtual resource, can be managed with abstraction layers to allow a logical disk organization. In one embodiment, the abstraction convention implemented in system 800 is the same as the abstraction used by a backend storage server at the data origin (e.g., storage server 712 of origin 710 in FIG. 7), However, the abstraction convention at system 800 could be different from a backend storage server that is the source of the cached data.

Virtual device layer 830 represents the virtual device as mapped by hypervisor 840. In one embodiment, virtual device 830 includes network interface 831, CPU 832, RAM 833, BIOS (Basic Input/Output System) 834, UART (Universal Asynchronous Receiver-Transmitter) 835, network storage 836, and local storage 837. Network interface 831 enables virtual device 810 to access other devices across networks via network interface(s) 852. CPU 832 represents the processing resources available to virtual machine 810, which consists of dedicated and/or shared processing resources 877.

RAM 833 represents memory resources allocated to virtual machine 810, and includes shared and/or dedicated resources of memory 874. BIOS 834 provides resources to initialize the software and virtual systems on the allocated hardware resources. UART 835 represents direct-connection resources, rather than point-to-point or network connection resources. Network storage 836 enables virtual machine 810 to access storage 860 via virtual filesystem 844 and controller 862. Local storage 837 can provide, for example, persistent write cache 854 for storing data at system 800.

Each of the components described at virtual device layer 830 has a physical complement at physical hardware layer 850. Hypervisor 840 maps the resources of virtual device layer 830 to its complement in physical hardware layer 850. Virtual device layer 830 is illustrated as included in virtual machine 810, but it will be understood that the resources are included virtually. Virtual machine 810 includes virtual caching appliance (VCA) 820 (which could also be referred to as a virtual storage adapter), which has access to the resources of virtual device layer 830 as the available computing resources.

VCA 820 includes software and drivers that manage and control the virtual resources. VCA 820 presents the virtual resources to the applications or workloads that execute on virtual machine 810. In one embodiment, VCA 820 includes driver 821, network stack 822, protocol(s) 823, OS 824, RAID 825, storage controller 826, network storage driver 827, and virtual nonvolatile RAM (V-NVRAM) 828.

Driver 821 provides driver resources to drive communication via the network interfaces. Network stack 822 implements one or more communication stacks for protocol(s) 823. Protocol(s) 823 include the one or more protocols used by virtual machine 810 to communicate with networked devices. Operating system 824 controls the flow of operation virtual machine 810. RAID 825 represents any type of storage abstraction used for managing storage, with one of the various versions of RAID being common types. Many abstraction types are possible. Storage controller 826 can include, for example, a storage stack and storage drivers used to access storage resources. Network storage driver 827 provides one type of driver for access to storage area networks (SANs), network area storage (NAS), or other networked storage. Virtual nonvolatile RAM 828 represents drivers for local storage of virtual machine 810.

Figure 9A:
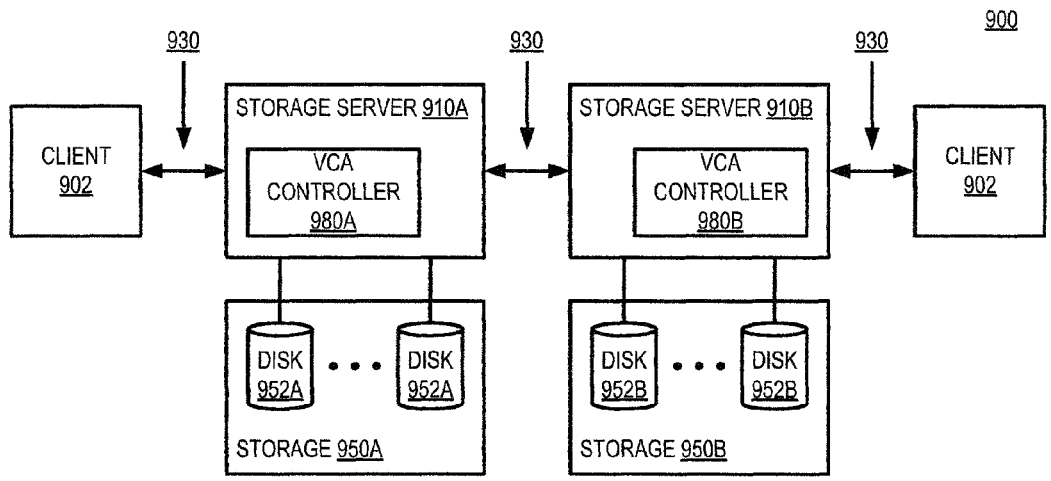
FIG. 9A illustrates a network storage system in which virtual cache appliance management can be implemented.

FIG. 9A illustrates a network storage system in which virtual cache appliance management can be implemented. Storage servers 910 (storage servers 910A, 910B) each manage multiple storage units 950 (storage 950A, 950B) that include mass storage devices. These storage servers provide data storage services to one or more clients 902 through a network 930. Network 930 can be, for example, a local area network (LAN), wide area network (WAN), metropolitan area network (MAN), global area network such as the Internet, a Fibre Channel fabric, or any combination of such interconnects. Each of clients 902 can be, for example, a conventional personal computer (PC), server-class computer, workstation, handheld computing or communication device, or other special or general purpose computer.

Storage of data in storage units 950 is managed by storage servers 910 which receive and respond to various read and write requests from clients 902, directed to data stored in or to be stored in storage units 950. Storage units 950 constitute mass storage devices which can include, for example, flash memory, magnetic or optical disks, or tape drives, illustrated as disks 952 (852A, 952B). Storage devices 952 can further be organized into arrays (not illustrated) implementing a Redundant Array of Inexpensive Disks/Devices (RAID) scheme, whereby storage servers 910 access storage units 950 using one or more RAID protocols known in the art.

Storage servers 910 can provide file-level service such as used in a network-attached storage (NAS) environment, block-level service such as used in a storage area network (SAN) environment, a service which is capable of providing both file-level and block-level service, or any other service capable of providing other data access services. Although storage servers 910 are each illustrated as single units in FIG. 9A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module), and the N-module can include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 9B and embodiments of a D-module and an N-module are described further below with respect to FIG. 10.

In one embodiment, storage servers 910 are referred to as network storage subsystems. A network storage subsystem provides networked storage services for a specific application or purpose, and can be implemented with a collection of networked resources provided across multiple storage servers and/or storage units.

In the embodiment of FIG. 9A, one of the storage servers (e.g., storage server 910A) functions as a primary provider of data storage services to client 902. Data storage requests from client 902 are serviced using disks 952A organized as one or more storage objects. A secondary storage server (e.g., storage server 910B) takes a standby role in a mirror relationship with the primary storage server, replicating storage objects from the primary storage server to storage Objects organized on disks of the secondary storage server (e.g., disks 950B). In operation, the secondary storage server does not service requests from client 902 until data in the primary storage object becomes inaccessible such as in a disaster with the primary storage server, such event considered a failure at the primary storage server. Upon a failure at the primary storage server, requests from client 902 intended for the primary storage object are serviced using replicated data (i.e. the secondary storage object) at the secondary storage server.

It will be appreciated that in other embodiments, network storage system 900 can include more than two storage servers. In these cases, protection relationships can be operative between various storage servers in system 900 such that one or more primary storage objects from storage server 910A can be replicated to a storage server other than storage server 910B (not shown in this figure). Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 910 should be taken as illustrative only.

In one embodiment, storage servers 910 include VCA controller components 980 (880A, 980B). VCA controller components 980 enable storage servers 910 to dynamically adjust caching in system 900 in response to workload changes. In one embodiment, VCA controller components 980 monitor workload performance for SLO violation and/or analyze system data to select a solution to correct the SLO violation.

Figure 9B:
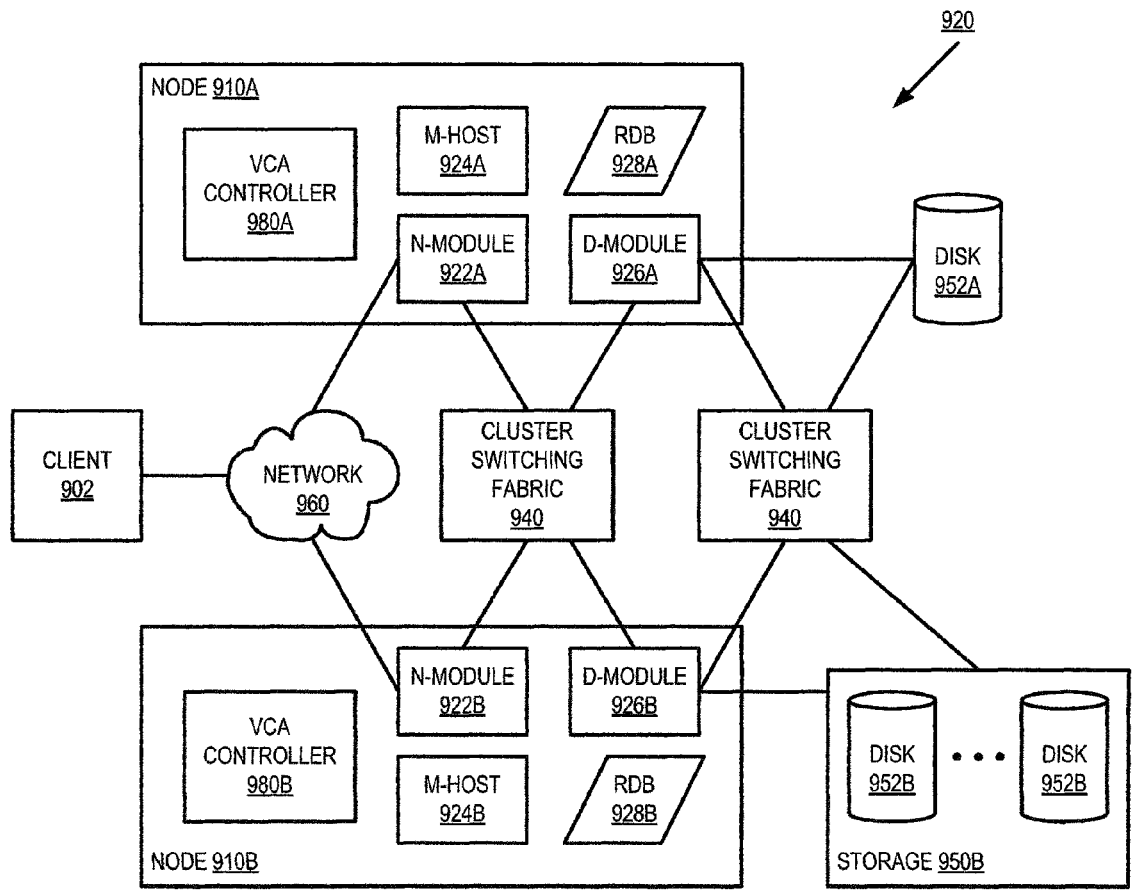
FIG. 9B illustrates a distributed or clustered architecture for a network storage system in which virtual cache appliance management can be implemented in an alternative embodiment.

FIG. 9B illustrates a distributed or clustered architecture for a network storage system in which virtual cache appliance management can be implemented in an alternative embodiment. System 920 can include storage servers implemented as nodes 910 (nodes 910A, 910B) which are each configured to provide access to storage devices 952. In FIG. 9B, nodes 910 are interconnected by a cluster switching fabric 940, which can be embodied as an Ethernet switch.

Nodes 910 can be operative as multiple functional components that cooperate to provide a distributed architecture of system 920. To that end, each node 910 can be organized as a network element or module (N-module 922A, 922B), a disk element or module (D-module 926A, 926B), and a management element or module (M-host 924A, 924B). In one embodiment, each module includes a processor and memory for carrying out respective module operations. For example, N-module 922 can include functionality that enables node 910 to connect to client 902 via network 930 and can include protocol components such as a media access layer, Internet Protocol (IP) layer, Transport Control Protocol (TCP) layer, User Datagram Protocol (UDP) layer, and other protocols known in the art.

In contrast, D-module 926 can connect to one or more storage devices 952 via cluster switching fabric 940 and can be operative to service access requests on devices 950. In one embodiment, the D-module 926 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 9B, a storage abstraction layer (e.g., file system) of the D-module divides the physical storage of devices 950 into storage objects. Requests received by node 910 (e.g. via N-module 922) can thus include storage object identifiers to indicate a storage object on which to carry out the request.

Also operative in node 910 is M-host 924 which provides cluster services for node 910 by performing operations in support of a distributed storage system image, for instance, across system 920. M-host 924 provides cluster services by managing a data structure such as a RDB 928 (RDB 928A, RDB 928B) which contains information used by N-module 922 to determine which D-module 926 "owns" (services) each storage object. The various instances of RDB 928 across respective nodes 910 can be updated regularly by M-host 924 using conventional protocols operative between each of the M-hosts (e.g., across network 930) to bring them into synchronization with each other. A client request received by N-module 922 can then be routed to the appropriate D-module 926 for servicing to provide a distributed storage system image.

In one embodiment, node 910A includes VCA controller 980A and node 910B includes VCA controller 980B. VCA controllers, as described above, can include monitoring components, analysis components, or both to dynamically adjust caching responsive to detected actual or anticipated SLO violations. In an alternate embodiment, VCA controller 980A or parts of it can also be implemented within M-host 924A, N-Module 922A, or D-Module 926A. Similarly, VCA controller 980B or components of it can be implemented within M-host 924B, N-Module 922B, or D-Module 926B.

It will be noted that while FIG. 9B shows an equal number of N- and D-modules constituting a node in the illustrative system, there can be different number of N- and D-modules constituting a node in accordance with various embodiments. For example, there can be a number of N-modules and D-modules of node 910A that does not reflect a one-to-one correspondence between the N- and D-modules of node 910B. As such, the description of a node comprising one N-module and one D-module for each node should be taken as illustrative only.

Figure 10:
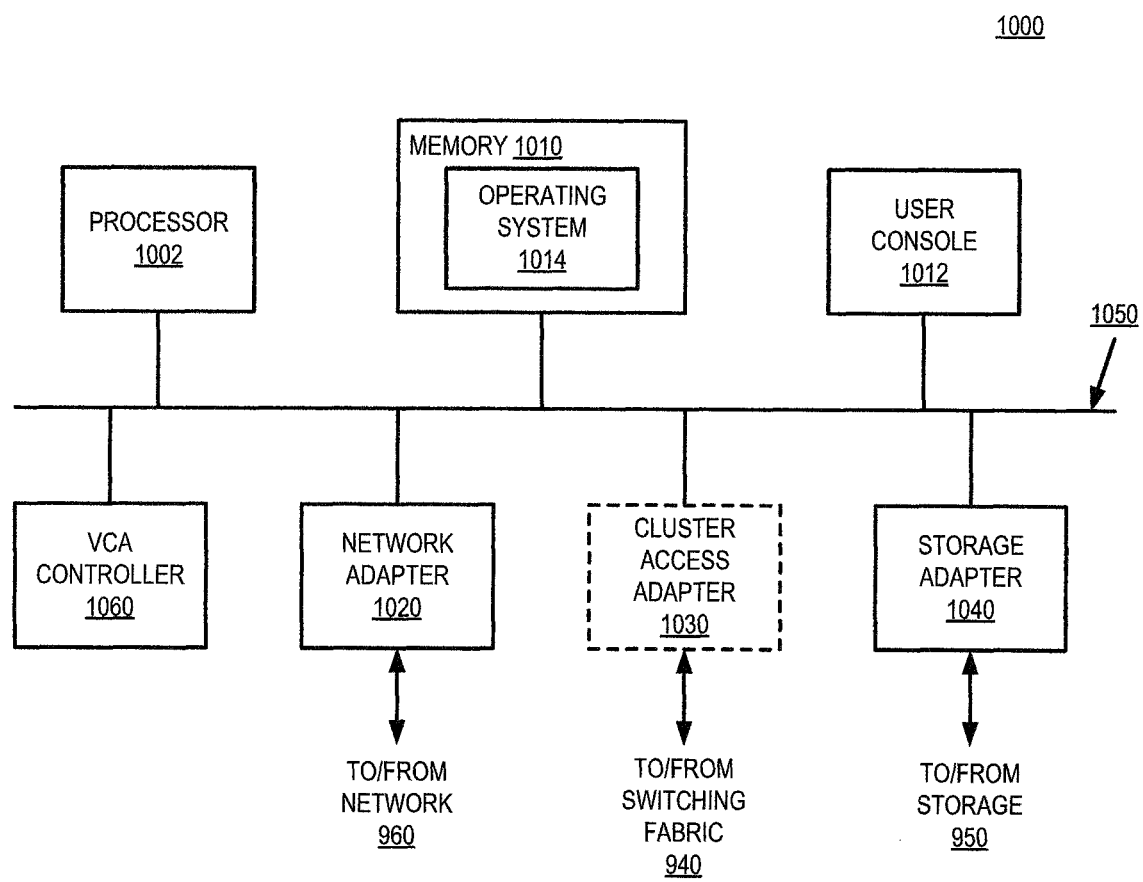
FIG. 10 is a block diagram of an illustrative embodiment of an environment of FIGS. 9A and 9B in which virtual cache appliance management can be implemented.

FIG. 10 is a block diagram of an embodiment of a storage server, such as storage servers 910A and 910B of FIG. 9A, embodied as a general or special purpose computer 1000 including a processor 1002, a memory 1010, a network adapter 1020, a user console 1012 and a storage adapter 1040 interconnected by a system bus 1050, such as a convention Peripheral Component Interconnect (PCI) bus.

Memory 1010 includes storage locations addressable by processor 1002, network adapter 1020 and storage adapter 1040 for storing processor-executable instructions and data structures associated with a multi-tiered cache with a virtual storage appliance. A storage operating system 1014, portions of which are typically resident in memory 1010 and executed by processor 1002, functionally organizes the storage server by invoking operations in support of the storage services provided by the storage server. It will be apparent to those skilled in the art that other processing means can be used for executing instructions and other memory means, including various computer readable media, can be used for storing program instructions pertaining to the inventive techniques described herein. It will also be apparent that some or all of the functionality of the processor 1002 and executable software can be implemented by hardware, such as integrated currents configured as programmable logic arrays, ASICs, and the like.

Network adapter 1020 comprises one or more ports to couple the storage server to one or more clients over point-to-point links or a network. Thus, network adapter 1020 includes the mechanical, electrical and signaling circuitry needed to couple the storage server to one or more client over a network. Each client can communicate with the storage server over the network by exchanging discrete frames or packets of data according to pre-defined protocols, such as TCP/IP.

Storage adapter 1040 includes a plurality of ports having input/output (I/O) interface circuitry to couple the storage devices (e.g., disks) to bus 1050 over an I/O interconnect arrangement, such as a conventional high-performance, FC or SAS link topology. Storage adapter 1040 typically includes a device controller (not illustrated) comprising a processor and a memory for controlling the overall operation of the storage units in accordance with read and write commands received from storage operating system 1014. As used herein, data written by a device controller in response to a write command is referred to as "write data," whereas data read by device controller responsive to a read command is referred to as "read data."

User console 1012 enables an administrator to interface with the storage server to invoke operations and provide inputs to the storage server using a command line interface (CLI) or a graphical user interface (GUI). In one embodiment, user console 1012 is implemented using a monitor and keyboard.

In one embodiment, computing device 1000 includes VCA controller 1060. While shown as a separate component, in one embodiment, VCA controller 1060 is part of OS 1014. VCA controller enables computer 1000 to generate runtime performance data related to workloads, and/or use such runtime data to determine how to adjust dynamically adjustable caching appliances in a storage system. In one embodiment, VCA controller 1060 compares runtime data to predefined service level objectives to determine if sufficient resources are being allocated to a workload. If the resource allocation is improper as indicated by a violation of the SLO, VCA controller 1060 can implement a caching change through a VCA to correct the violation.

When implemented as anode of a cluster, such as cluster 920 of FIG. 9B, the storage server further includes a cluster access adapter 1030 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

Figure 11:
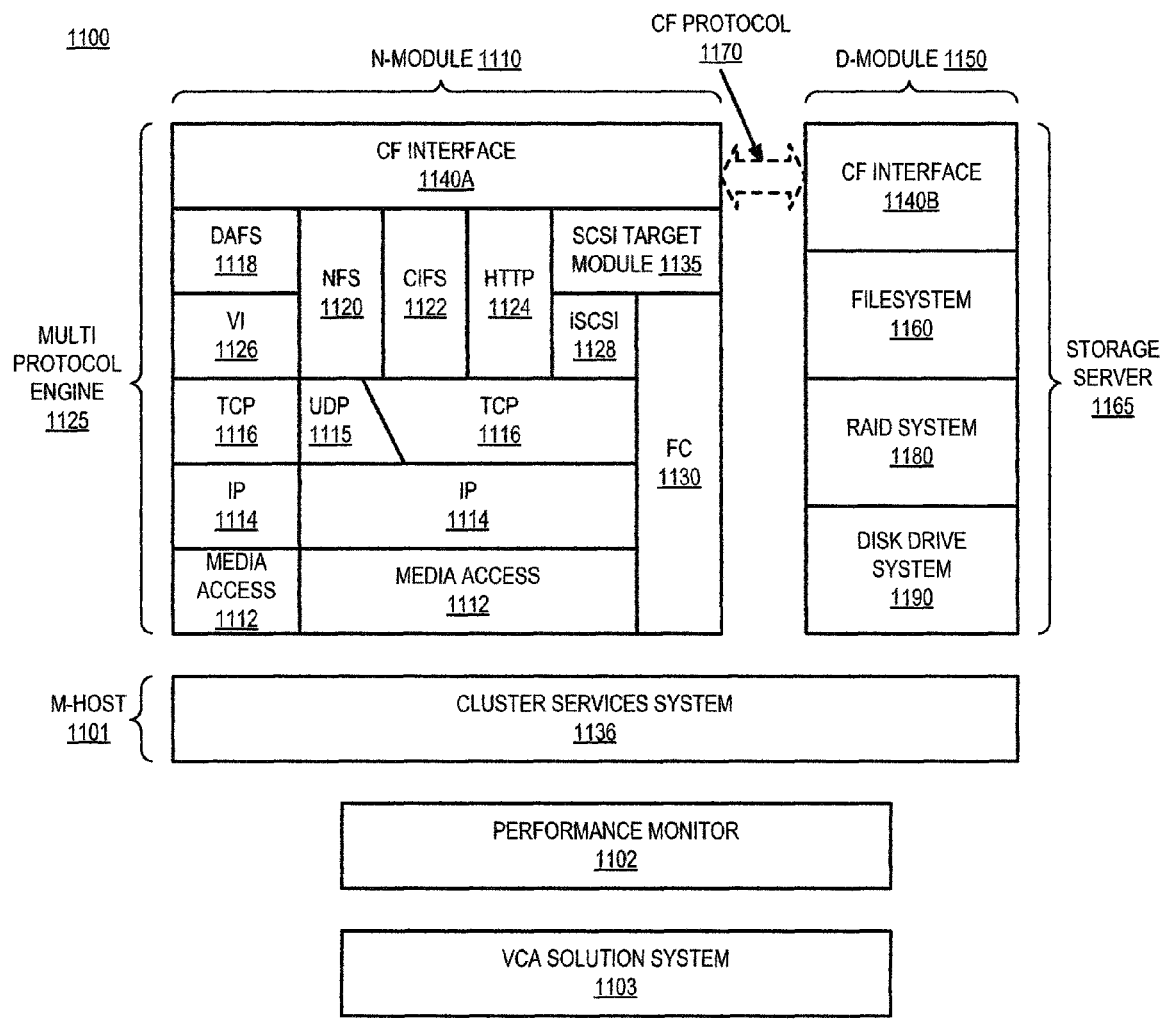
FIG. 11 illustrates an embodiment of the storage operating system of FIG. 10 in which virtual cache appliance management can be implemented.

FIG. 11 is a block diagram of a storage operating system 1100, such as storage operating system 1014 of FIG. 10, in which virtual cache appliance management can be implemented. The storage operating system comprises a series of software layers executed by a processor, such as processor 1002 of FIG. 10, and organized to form an integrated network protocol stack or, more generally, a multi-protocol engine 1125 that provides data paths for clients to access information stored on the storage server using block and file access protocols.

Multi-protocol engine 1125 includes a media access layer 1112 of network drivers (e.g., gigabit Ethernet drivers) that interface with network protocol layers, such as the IP layer 1114 and its supporting transport mechanisms, the TCP layer 1116 and the User Datagram Protocol (UDP) layer 1115, A file system protocol layer provides multi-protocol file access and, to that end, includes support for the Direct Access File System (DAFS) protocol 1118, the NFS protocol 1120, the CIFS protocol 1122 and the Hypertext Transfer Protocol (HTTP) protocol 1124. A VI layer 1126 implements the VI architecture to provide direct access transport (DAT) capabilities, such as RDMA, as required by the DAFS protocol 1118. An iSCSI driver layer 1128 provides block protocol access over the TCP/IP network protocol layers, while a FC driver layer 1130 receives and transmits block access requests and responses to and from the storage server. In certain cases, a Fibre Channel over Ethernet (FCoE) layer (not shown can also be operative in multi-protocol engine 1125 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 1165 that provides data paths for accessing information stored on storage devices. Information can include data received from a client, in addition to data accessed by the storage operating system in support of storage server operations such as program application data or other system data. Preferably, client data can be organized as one or more logical storage objects (e.g., volumes) that comprise a collection of storage devices cooperating to define an overall logical arrangement. In one embodiment, the logical arrangement can involve logical volume block number (vbn) spaces, wherein each volume is associated with a unique vbn.

File system 1160 implements a virtualization system of the storage operating system through the interaction with one or more virtualization modules (illustrated as a SCSI target module 1135). SCSI target module 1135 is generally disposed between drivers 1128, 1130 and file system 1160 to provide a translation layer between the block (lun) space and the file system space, where luns are represented as blocks. In one embodiment, file system 1160 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 1160 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 1112 or layer 1130 processes the packet and, if appropriate, passes it on to a network protocol and file access layer for additional processing prior to forwarding to file system 1160. There, file system 1160 generates operations to load (retrieve) the requested data from the disks if it is not resident "in core", i.e., in memory 1010. If the information is not in memory, file system 1160 accesses the mode file to retrieve a logical vbn and passes a message structure including the vbn to the RAID system 1180. There, the logical vbn is mapped to a disk identifier and device block number (disk, dbn) and sent to an appropriate driver of disk driver system 1190. The disk driver accesses the dbn from die specified disk and loads the requested data block(s) in memory for processing by the storage server. Upon completion of the request, the node (and operating system 1100) returns a reply to the client over the network.

It should be noted that the software "path" through the storage operating system layers described above needed to perform data storage access for the client request received at the storage server adaptable to the teachings of the invention can alternatively be implemented in hardware. That is, in an alternate embodiment of the invention, a storage access request data path can be implemented as logic circuitry embodied within a field programmable gate array (FPGA) or an application specific integrated circuit (ASIC). This type of hardware embodiment increases the performance of the storage service provided by the storage server in response to a request issued by a client. Moreover, in another alternate embodiment of the invention, the processing elements of adapters 1020, 1040 can be configured to offload some or all of the packet processing and storage access operations, respectively, from processor 1002, to thereby increase the performance of the storage service provided by the storage server. It is expressly contemplated that the various processes, architectures and procedures described herein can be implemented in hardware, firmware or software.

When implemented in a cluster, data access components of the storage operating system can be embodied as D-module 1150 for accessing data stored on disk. In contrast, multi-protocol engine 1125 can be embodied as N-module 1110 to perform protocol termination with respect to a client issuing incoming access over the network, as well as to redirect the access requests to any other N-module in the cluster. A cluster services system 1136 can further implement an M-host (e.g., NI-host 1101) to provide cluster services for generating information sharing operations to present a distributed file system image for the cluster. For instance, media access layer 1112 can send and receive information packets between the various cluster services systems of the nodes to synchronize the replicated databases in each of the nodes.

In addition, a cluster fabric (CF) interface module 1140 (CF interface modules 1140A, 1140B) can facilitate intra-cluster communication between N-module 1110 and D-module 1150 using a CF protocol 1170. For instance, D-module 1150 can expose a CF application programming interface (API) to which N-module 1110 (or another D-module not shown) issues calls. To that end, CF interface module 1140 can be organized as a CF encoder/decoder using local procedure calls (LPCs) and remote procedure calls (RPCs) to communicate a file system command to between D-modules residing on the same node and remote nodes, respectively.

In one embodiment, storage operating system 1100 includes a performance monitor layer 1102, which enables the storage operating system to provide services related to monitoring performance of workloads with respect to their SLOs. Performance monitor layer 1102 can be implemented as an interrupt-driven routine that operates at periodic intervals to perform monitoring operations. In one embodiment, storage operating system 1100 includes VCA solution system 1103, which enables the storage operating system to provide services related to determining how to cure a detected SLO violation. The services include one or more algorithms executed to determine what possible solutions may exist, and select one of the possible solutions for implementation. Additionally, VCA solution system 1103 can include routines to issue commands related to instantiating and resizing VCAs. In an alternate embodiment, components 1102 and 1103, or parts of them, can be implemented as part of N-Module 1110, D-Module 1150, or M-Host 1101.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, ovum a general-purpose operating system with configurable functionality, which is configured for storage applications as described herein.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:
1. A method comprising:
  detecting that a metric associated with a first workload has breached a first threshold;

determining that the first workload and a second workload access the same storage resources, wherein the storage resources are associated with a storage server;

determining that the metric is impacted by the first workload and the second workload accessing the same storage resources; and in response to determining that the metric is impacted by the first workload and the second workload accessing the same storage resources, instantiating a first virtual cache appliance; and routing one of the first workload or the second workload through the first virtual cache appliance, wherein routing one of the first workload or the second workload through the first virtual cache appliance causes the first virtual cache appliance to cache data associated with the storage resources.

2. The method of claim 1, wherein the first workload is associated with a compute server.

3. The method of claim 2, wherein the first virtual cache appliance is instantiated on the compute server.

4. The method of claim 2, wherein the first virtual cache appliance is instantiated on a server other than the compute server.

5. The method of claim 1, wherein the storage server comprises a cache separate from the first virtual cache appliance, wherein the cache caches data associated with the storage resources.

6. The method of claim 1, wherein the first workload is associated with a first compute server and the second workload is associated with a second compute server, wherein the method further comprises:

determining that the first virtual cache appliance cannot be instantiated on the first compute server;

wherein instantiating the first virtual cache appliance comprises instantiating the first virtual cache appliance on the second compute server in response to determining that the first virtual cache appliance cannot be instantiated on the first compute server;

wherein routing one of the first workload or the second workload through the first virtual cache appliance comprises routing the second workload through the first virtual cache appliance.

7. The method of claim 6, wherein determining that the first virtual cache appliance cannot be instantiated on the first compute server comprises determining at least one of:

that the first compute server does not have sufficient resources to support the first virtual cache appliance; or that the first workload is routed through a second virtual cache appliance.

8. The method of claim 6, wherein determining that the first virtual cache appliance cannot be instantiated on the first compute server comprises determining that the first workload is not a cacheable workload.

9. The method of claim 1 further comprising:

determining frequently accessed data associated with the storage resources; and writing the frequently accessed data to the first virtual cache appliance prior to the frequently accessed data being requested by one of the first workload or the second workload.

10. The method of claim 1 further comprising:

determining that the first virtual cache appliance is underutilized; and reducing the amount of resources allocated to the first virtual cache appliance.

11. The method of claim 10, wherein reducing the amount of resources allocated comprises releasing the first virtual cache appliance.

12. The method of claim 11, wherein releasing the first virtual cache appliance further comprises:

identifying a plurality of virtual cache appliances as candidates for releasing;

calculating an impact on the metric associated with the first workload; and determining that the impact on the metric associated with the first workload is within a second threshold;

wherein releasing the first virtual cache appliance is in response to determining that the impact on the metric associated with the first workload is within the second threshold.

13. The method of claim 1 further comprising, in response to determining that the metric is impacted by the first workload and the second workload accessing the same storage resources, determining an estimated impact of a residual workload and determining an impact to the metric based, at least in part, on the impact of the residual workload, wherein the residual workload is a workload on the storage resources after instantiation of the first virtual cache appliance.

14. A device comprising:

a processor; and a computer readable storage medium having program code embodied therein, the program code executable by the processor to cause the device to, detect that a metric associated with a first workload has breached a first threshold;

determine that the first workload and a second workload access the same storage resources, wherein the storage resources are associated with a storage server;

determine that the metric is impacted by the first workload and the second workload accessing the same storage resources; and in response to a determination that the metric is impacted by the first workload and the second workload accessing the same storage resources, instantiate a first virtual cache appliance; and route one of the first workload or the second workload through the first virtual cache appliance, wherein routing one of the first workload or the second workload through the first virtual cache appliance causes the first virtual cache appliance to cache data associated with the storage resources.

15. The device of claim 14, wherein the storage server comprises a cache separate from the first virtual cache appliance, wherein the cache caches data associated with the storage resources.

16. The device of claim 14, wherein the first workload is associated with a first compute server and the second workload is associated with a second compute server, wherein the program code further comprises program code executable by the processor to cause the device to:

determine that the first virtual cache appliance cannot be instantiated on the first compute server;

wherein the program code executable by the processor to cause the device to instantiate the first virtual cache appliance comprises program code executable by the processor to cause the device to instantiate the first virtual cache appliance on the second compute server in response to a determination that the first virtual cache appliance cannot be instantiated on the first compute server;

wherein the program code executable by the processor to cause the device to route one of the first workload or the second workload through the first virtual cache appliance comprises program code executable by the processor to cause the device to route the second workload through the first virtual cache appliance.

17. The device of claim 16, wherein the program code executable by the processor to cause the device to determine that the first virtual cache appliance cannot be instantiated on the first compute server comprises program code executable by the processor to cause the device to determine at least one of:
that the first computer server does not have sufficient resources to support the first virtual cache appliance; or
that the first workload is routed through a second virtual cache appliance.

18. The device of claim 16, wherein the program code executable by the processor to cause the device to determine that the first virtual cache appliance cannot be instantiated on the first compute server comprises program code executable by the processor to cause the device to determine that the first workload is not a cacheable workload.

19. The device of claim 14, wherein the program code further comprises program code executable by the processor to cause the device to:
determining frequently accessed data associated with the storage resources; and
writing the frequently accessed data to the first virtual cache appliance prior to the frequently accessed data being requested by one of the first workload or the second workload.

20. The device of claim 14, wherein the program code comprises further program code executable by the processor to cause the device to:
determine that the first virtual cache appliance is underutilized; and
reduce the amount of resources allocated to the first virtual cache appliance.

21. The device of claim 20, wherein the program code executable by the processor to cause the device to reduce the amount of resources allocated comprises program code executable by the processor to cause the device to release the first virtual cache appliance.

22. The device of claim 21, wherein the program code executable by the processor to cause the device to release the first virtual cache appliance comprises program code executable by the processor to cause the device to:
identify a plurality of virtual cache appliances as candidates for releasing;
calculate an impact on the metric associated with the first workload; and
determine that the impact on the metric associated with the first workload is within a second threshold; wherein the program code executable by the processor to cause the device to release the first virtual cache appliance comprises program code executable by the processor to cause the device to release the first virtual cache appliance in response to a determination that the impact on the metric associated with the first workload is within the second threshold.

23. The device of claim 14, wherein the program code further comprises program code executable by the processor to cause the device to, in response to a determination that the metric is impacted by the first workload and the second workload accessing the same storage resources, determine an estimated impact of a residual workload and determining an impact to the metric based, at least in part, on the impact of the residual workload, wherein the residual workload is a workload on the storage resources after instantiation of the first virtual cache appliance.

24. The device of claim 14, wherein the first workload is associated with a compute server, wherein the first virtual cache appliance is instantiated on a server other than the compute server.

25. An article of manufacture comprising a non-transitory computer readable storage medium having instructions stored thereon, the instructions comprising program code to:
detect that a metric associated with a first workload has breached a first threshold;
determine that the first workload and a second workload access the same storage resources, wherein the storage resources are associated with a storage server;
determine that the metric is impacted by the first workload and the second workload accessing the same storage resources; and
in response to a determination that the metric is impacted by the first workload and the second workload accessing the same storage resources,
instantiate a first virtual cache appliance; and
route one of the first workload or the second workload through the first virtual cache appliance, wherein routing one of the first workload or the second workload through the first virtual cache appliance causes the first virtual cache appliance to cache data associated with the storage resources.

26. The article of manufacture of claim 25, wherein the first workload is associated with a first compute server and the second workload is associated with a second compute server, wherein the program code further comprises program code to:
determine that the first virtual cache appliance cannot be instantiated on the first compute server;
wherein the program code to instantiate the first virtual cache appliance comprises program code to instantiate the first virtual cache appliance on the second compute server in response to a determination that the first virtual cache appliance cannot be instantiated on the first compute server;
wherein the program code to route one of the first workload or the second workload through the first virtual cache appliance comprises program code to route the second workload through the first virtual cache appliance.

27. The article of manufacture of claim 26, wherein the program code to determine that the first virtual cache appliance cannot be instantiated on the first compute server comprises program code to determine at least one of:
that the first computer server does not have sufficient resources to support the first virtual cache appliance; or
that the first workload is routed through a second virtual cache appliance.

28. The article of manufacture of claim 26, wherein the program code to determine that the first virtual cache appliance cannot be instantiated on the first compute server comprises program code to determine that the first workload is not a cacheable workload.

29. The article of manufacture of claim 25, wherein the program code further comprises program code to:
determine frequently accessed data associated with the storage resources; and
writing the frequently accessed data to the first virtual cache appliance prior to the frequently accessed data being requested by one of the first workload or the second workload.

30. The article of manufacture of claim 25, wherein the program code further comprises program code to:
  determine that the first virtual cache appliance is underutilized; and
  reduce the amount of resources allocated to the first virtual cache appliance.

31. The article of manufacture of claim 30, wherein the program code to reduce the amount of resources allocated comprises program code to release the first virtual cache appliance.

32. The article of manufacture of claim 31, wherein the program code to release the first virtual cache appliance comprises program code to:
  identify a plurality of virtual cache appliances as candidates for releasing;
  calculating an impact on the metric associated with the first workload; and
  determine that the impact on the metric associated with the first workload is within a second threshold;
  wherein the program code to release the first virtual cache appliance comprises program code to release the first virtual cache appliance in response to a determination that the impact on the metric associated with the first workload is within the second threshold.

33. The article of manufacture of claim 25, wherein the program code further comprises program code to, in response to a determination that the metric is impacted by the first workload and the second workload accessing the same storage resources, determine an estimated impact of a residual workload and determining an impact to the metric based, at least in part, on the impact of the residual workload, wherein the residual workload is a workload on the storage resources after instantiation of the first virtual cache appliance.

34. The article of manufacture of claim 25, wherein the first workload is associated with a compute server, wherein the first virtual cache appliance is instantiated on a server other than the compute server.

\* \* \* \* \*